(12) United States Patent
Ozaki

(10) Patent No.: US 7,213,108 B2
(45) Date of Patent: May 1, 2007

(54) INFORMATION PROCESSING APPARATUS AND METHOD, STORAGE MEDIUM, PROGRAM AND IMAGING APPARATUS

(75) Inventor: Koji Ozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 10/815,871

(22) Filed: Apr. 2, 2004

(65) Prior Publication Data

US 2004/0260907 A1     Dec. 23, 2004

(30) Foreign Application Priority Data

Apr. 11, 2003  (JP)  ............................. 2003-107351
Oct. 23, 2003  (JP)  ............................. 2003-362812

(51) Int. Cl.
    *G06F 12/12*    (2006.01)
(52) U.S. Cl. ...................................... 711/129; 711/209
(58) Field of Classification Search .................... 711/3, 711/203, 207, 1, 129; 712/32, 225
See application file for complete search history.

(56) References Cited

U.S. PATENT DOCUMENTS

| 4,145,738 A | 3/1979 | Inoue et al. |
| 4,471,432 A * | 9/1984 | Wilhite et al. .................. 711/3 |
| 4,481,573 A * | 11/1984 | Fukunaga et al. .......... 711/207 |
| 4,860,192 A * | 8/1989 | Sachs et al. ................... 711/3 |
| 4,991,081 A * | 2/1991 | Bosshart ........................ 711/3 |
| 5,347,636 A * | 9/1994 | Ooi et al. .................. 711/203 |
| 5,386,580 A * | 1/1995 | Yoshida et al. ............... 712/32 |
| 5,870,596 A * | 2/1999 | Yoshida ...................... 712/225 |
| 2005/0027921 A1* | 2/2005 | Hirotsu et al. ................. 711/1 |

FOREIGN PATENT DOCUMENTS

| EP | 0 327 798 | 8/1989 |
| EP | 0 528 584 | 2/1993 |

* cited by examiner

*Primary Examiner*—Pierre Bataille
*Assistant Examiner*—Paul Schle
(74) *Attorney, Agent, or Firm*—Oblon, Spivak, McClelland, Maier & Neustadt, P.C.

(57) ABSTRACT

An instruction virtual address space includes only virtual addresses corresponding to physical addresses of address areas of a physical address space storing pages of only instructions. A data virtual address space includes only virtual addresses corresponding to physical addresses of address areas of the physical address space storing pages of only data. The instruction and data virtual address spaces use duplicated virtual addresses. Instruction and data address translation units translate virtual addresses of the instruction and data virtual address spaces into physical addresses of the single physical address space. A data access efficiency and an instruction execution speed can be improved.

12 Claims, 27 Drawing Sheets

FIG. 24

| INSTRUCTION VIRTUAL ADDRESS SPACE | | |
|---|---|---|
| LABEL | INSTRUCTION | OPERATION CONTENTS |
| | LOAD R0, jpegstart | READ CONSTANT 0x00000100 TO BE WRITTEN IN JPEG START-UP REGISTER |
| | STORE R0, jpegcodecreg | WRITE CONSTANT 0x00000100 IN JPEG START-UP REGISTER jpegcodecreg |
| | LOAD R0, jpegstatusreg | READ JPEG STATUS REGISTER jpegstatusreg (CONFIRM END) |

| DATA VIRTUAL ADDRESS SPACE | | |
|---|---|---|
| LABEL | DATA | CONTENTS |
| jpegstart | 0x00000100 | WRITE IN JPEG START-UP REGISTER |
| jpegcodecreg | VALUE OUTPUT FROM JPEG ENCODER SECTION | JPEG START-UP REGISTER |
| jpegstatusreg | VALUE OUTPUT FROM JPEG ENCODER SECTION | JPEG STATUS REGISTER |

FIG. 26

| VIRTUAL ADDRESS SPACE | | |
|---|---|---|
| LABEL | INSTRUCTION OR DATA | OPERATION CONTENTS |
| | LOAD R0, jpegcodec | READ ADDRESS DATA jpegcodecreg OF JPEG START-UP REGISTER |
| | LOAD R1, jpegstart | READ CONSTANT 0x00000100 TO BE WRITTEN IN JPEG START-UP REGISTER |
| | STORE R1, [R0] | WRITE CONSTANT 0x00000100 IN JPEG START-UP REGISTER jpegcodecreg |
| | JMP next | UNCONDITIONAL BRANCH TO ADDRESS "LOAD R0, jpegstatus" OF next |
| jpegcodec | jpegcodecreg | ADDRESS DATA OF JPEG START-UP REGISTER |
| jpegstart | 0x00000100 | DATA TO BE WRITTEN IN JPEG START-UP REGISTER |
| jpegstatus | jpegstatusreg | ADDRESS DATA OF JPEG STATUS REGISTER |
| next | LOAD R0, jpegstatus | READ ADDRESS DATA jpegstatusreg OF JPEG STATUS REGISTER |
| | LOAD R1, [R0] | READ JPEG STATUS REGISTER (CONFIRM END) |
| jpegcodecreg | VALUE OUTPUT FROM JPEG ENCODER SECTION | JPEG START-UP REGISTER |
| jpegstatusreg | VALUE OUTPUT FROM JPEG ENCODER SECTION | JPEG STATUS REGISTER |

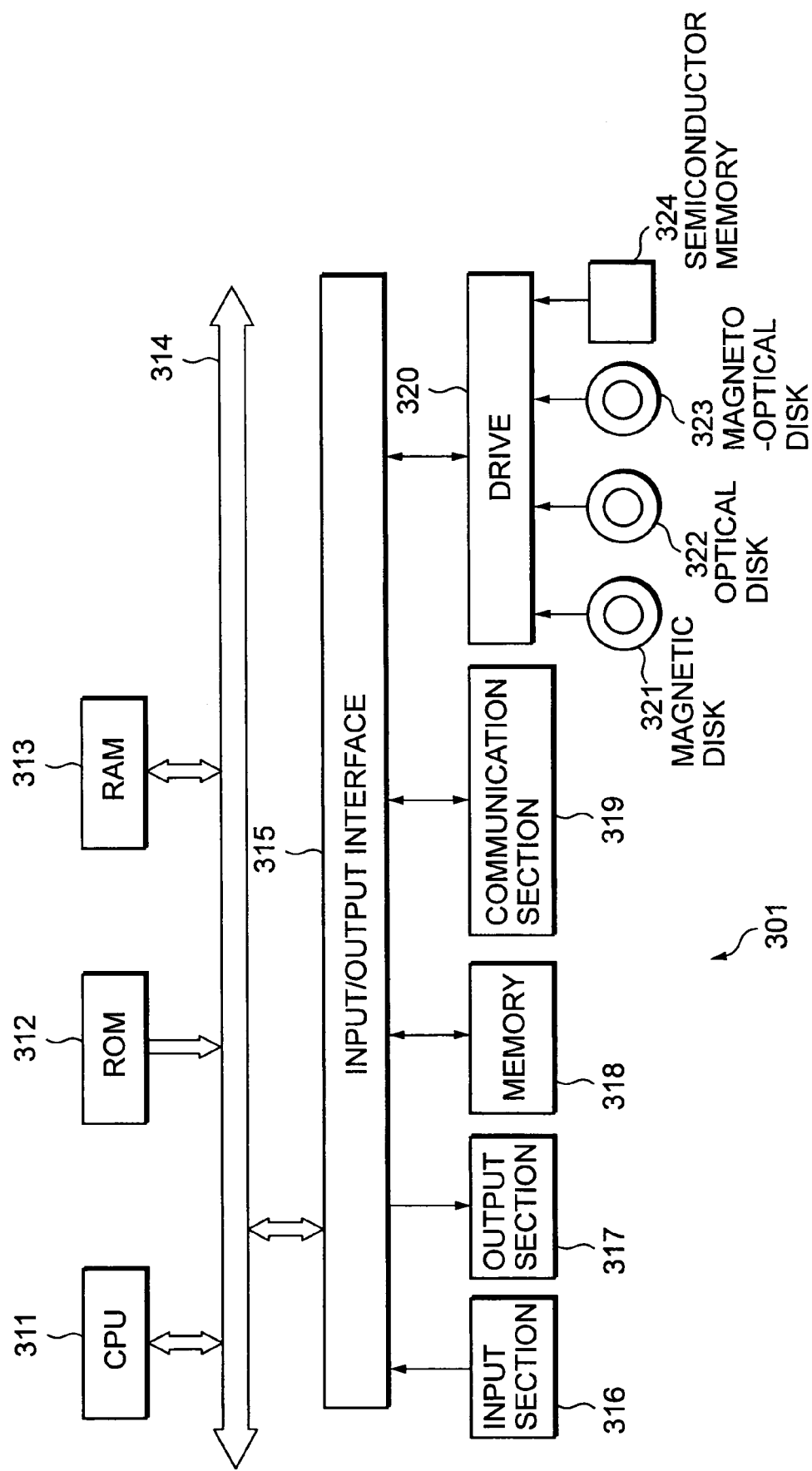

INFORMATION PROCESSING APPARATUS AND METHOD, STORAGE MEDIUM, PROGRAM AND IMAGING APPARATUS

CROSS REFERENCES TO RELATED APPLICATIONS

The present invention claims priority to its priority document No. 2003-362812 filed in the Japanese Patent Office on Oct. 23, 2003 and No. 2003-107351 filed in the Japanese Patent Office on Apr. 11, 2003, the entire contents of which being incorporated by reference herein.

BACKGROUND OF THE INVENTION

1. Field of the Invention

The present invention relates to an information processing apparatus and method, a storage medium, a program and an imaging apparatus, and more particularly to an information processing apparatus and method, a storage medium, a program and an imaging apparatus, which are capable of improving an efficiency of data access and an instruction execution speed.

2. Description of Related Art

As disclosed in Japanese Patent Application Publication JP06-75854, there is an information processing apparatus whose instruction bus and data bus are separated. In the information processing apparatus of this type, instructions and data are transferred to and from a memory by using single virtual address space. Namely, a central processing unit (CPU) transfers an instruction to an instruction bus by using a virtual address space, and transfers data to a data bus by using the same virtual address space.

FIG. 1 shows an example of the structure of virtual and physical address spaces in the related art. In FIG. 1, the virtual address space 1 is an address space of a memory as viewed from the CPU and the physical address space is the space of a real memory. In the example shown in FIG. 1, although the virtual address space 1 and physical address space 2 are in one-to-one correspondence, some information processing apparatus uses a plurality of virtual address spaces and one physical address space in many-to-one correspondence.

In the example shown in FIG. 1, the virtual address space 1 includes: address areas 1-1 to 1-5 in which the virtual addresses of both instructions and data are disposed in a mixed manner in the order of address; and address areas 1-6 to 1-8 in which the virtual addresses of only data are disposed. In each area, instructions or data are disposed by a unit of a page size which is the minimum unit of address translation (e.g., 4 k bytes).

Pages of instructions and data disposed in the address area 1-1 of the virtual address space 1 are stored actually in an address area 2-1 of the physical address space 2. Pages of instructions and data disposed in the address area 1-2 of the virtual address space 1 are stored actually in an address area 2-2 of the physical address space 2. Pages of instructions and data disposed in the address area 1-3 of the virtual address space 1 are stored actually in an address area 2-6 of the physical address space 2. Pages of instructions and data disposed in the address area 1-4 of the virtual address space 1 are stored actually in an address area 2-4 of the physical address space 2.

Pages of instructions and data disposed in the address area 1-5 of the virtual address space 1 are stored actually in an address area 2-3 of the physical address space 2. Data pages disposed in the address area 1-6 of the virtual address space 1 are stored actually in an address area 2-5 of the physical address space 2. Data pages disposed in the address area 1-7 of the virtual address space 1 are stored actually in an address area 2-8 of the physical address space 2. Data pages disposed in the address area 1-8 of the virtual address space 1 are stored actually in an address area 2-7 of the physical address space 2.

As described above, in the virtual address space 1 and physical address space 2, virtual addresses and physical addresses are one-to-one correspondence. Accordingly, if the CPU designates a virtual address of an instruction or data by referring to the virtual address space 1, the designated virtual address is translated into a physical address. The instruction or data corresponding to the translated physical address is read from a memory and transferred to the CPU. In this manner, the CPU can execute an instruction corresponding to the designated virtual address.

In the related art, the same virtual address space shown in FIG. 1 is used for both instruction transfer and data transfer. Since long data to be used with an instruction is required to be stored as additional data, virtual addresses of instructions and data are disposed in the virtual address space in a mixed manner.

FIG. 2 shows an example of the structure of the address area 1-1 of the virtual address space 1 shown in FIG. 1. In the example shown in FIG. 2, the address area 1-1 includes virtual addresses for storing instructions 1 to 4, a jump instruction 1, data 1, data 2, and instructions 5 to 9, respectively in this order from the upper area. The CPU designates the virtual address of the address area 1-1 to execute the instruction stored for the virtual address. For example, the CPU designates the virtual addresses of the instructions 1 to 9 to sequentially execute the instructions starting from the instruction 1. In the example shown in FIG. 2, however, there are the virtual addresses of the data 1 and data 2 between the virtual addresses of the instructions 4 and 5. Therefore, as the instructions are sequentially executed starting from the instruction 1, the instruction 5 is required to be executed after the instruction 4. It is therefore necessary to dispose the jump instruction 1 for an unconditional branch from the instruction 4 to the instruction 5, immediately after the virtual address of the instruction 4.

As shown in FIG. 3, if the instruction 3 requires to read data 3 and the virtual address for storing the data 3 is stored at the virtual address at a distance d2 unable to be designated by the operand of the instruction 3 (the distance d2 remote from the virtual address for the instruction 3), then the operand of the instruction 3 cannot directly designate the data 3. In order to read the data 3, it is necessary to hold the data 2 as a relative address of the data 3 once at the virtual address at a distance d1 allowing the operand of the instruction 3 to directly designate. In this case, the instruction 3 reads the relative address of the data 3 held as the data 2, and by using the relative address, the instruction 4 can read the data 3. As compared to the direct designation, it is necessary to use two instructions and the data (relative address) held for the instruction.

If the instruction bus and the data bus are separated, the information processing apparatus is usually provided with an instruction cache (memory) 11 and a data cache (memory) 12, as shown in FIG. 4. In the example shown in FIG. 4, as the CPU designates the virtual address of the jump instruction 1 in the address area 1-1, a range e1 from the jump instruction 1, data 1, data 2 and to instruction 5 is registered in the instruction cache 11. As the CPU designates the virtual address of the data 1, the same range e1 is registered in the data cache 12. More specifically, not only the jump instruction 1 and instruction 5 but also the data 1 and 2 (hatched portion in FIG. 4) not used as the instruction are registered in the instruction cache 11. Similarly, not only the data 1 and 2 but also the jump instruction 1 and instruction 5 (hatched portion in FIG. 4) not used as the data are registered in the data cache 12.

SUMMARY OF THE INVENTION

As described above, in the information processing apparatus having the separated instruction and data buses, the virtual addresses of both the instruction and data are disposed in the virtual address space 1 in a mixed manner because the same virtual address space 1 is used. Therefore, if the instruction uses data, the jump instruction is required to jump to the data if the instruction is executed. The number of instructions therefore increases and an instruction execution time prolongs. Furthermore, if the virtual address of the data to be used by the instruction is at the distance d2 that the operand of the instruction cannot be designated, the relative address of the target data is required to be stored as another data. It is therefore necessary to use another instruction to fetch the address and causes an increase of an instruction execution time.

In addition to the above-described points, data is stored in the instruction cache 11, and instructions are stored in the data cache 12, thereby consuming valuable memory areas.

It is desirable to improve a data access efficiency and an instruction execution speed. The present invention has been made in view of the above-described circumstances.

An information processing apparatus according to an embodiment of the present invention includes: a plurality of transfer means for transferring an instruction or data between processor means and storage means; and at least one address translation means for translating a virtual address designated by the processor means into a physical address of the storage means. Each of the transfer means include an independent virtual address space including addresses, which is mutually overlapping with virtual address spaces of the other transfer means. The address translation means translate the virtual address space of the transfer means into a single physical address space.

The transfer means may include an instruction bus for transferring the instruction and a data bus for transferring the data. A difference between a virtual address of an instruction accompanying an access to the transfer means and a virtual address of data accessed by the instruction may be equal to or shorter than a distance which can be directly designated as a relative address by an operand of the instruction.

The information processing apparatus may further include a cache provided for each of the transfer means, the cache using the virtual address as a tag.

The virtual address space may include virtual addresses in such a manner that a border between a virtual address of the instruction and a virtual address of the data becomes a line border of the cache.

The information processing apparatus may further include a cache for making a distinction between a plurality of the transfer means and identifying cache data.

The virtual address space may include virtual addresses in such a manner that a border between a virtual address of the instruction and a virtual address of the data becomes a line border of the cache.

If a translation unit of an address to be translated by the address translation means contains both a virtual address of the instruction and a virtual address of the data, data included in the translation unit may be only constant data.

The address translation means may translate the virtual address space of the transfer means into the single physical address space having mutually non-overlapping addresses.

The storage means may include a write inhibited area and a write permitted area. Virtual addresses of both the write inhibited area and the write permitted area may be disposed in a virtual address space in a range that can be directly designated as a relative address by an operand of an instruction accompanying an access to the storage means.

The storage means may include at least one input/output (I/O) register. A difference between a virtual address of the instruction accompanying an access to the I/O register and a virtual address representative of the I/O register may be equal to or shorter than a distance that can be directly designated as a relative address by an operand of the instruction.

A virtual address representative of the same I/O register may be divided and disposed in a plurality of areas of the virtual address space.

The address translation means may translate upper n bits of the virtual address of (n+m) bits, and at least one bit or more of the translated upper n bits may be exchanged with at least one or more bits of the remaining m bits, thereby translating the virtual address into the physical address.

The address translation means may translate upper n bits of the virtual address of (n+m) bits, and at least one bit or more of the remaining lower m bits may be exchanged with another one bit or more of the remaining lower m bits, thereby translating the virtual address into the physical address.

According to an embodiment of the present invention, there is provided an information processing method for an information processing apparatus. The information processing apparatus includes: processor means for executing an operation; storage means for storing an instruction or data necessary for the processor means to execute the operation; a plurality of transfer means for transferring the instruction or data between the processor means and the storage means; and at least one address translation means for translating a virtual address designated by the processor means into a physical address of the storage means. Each of the transfer means includes an independent virtual address space including addresses, which is mutually overlapping with virtual address spaces of the other transfer means; and the address translation means includes a translation step of translating the virtual address space of the transfer means into a single physical address space.

The information processing method may further include the step of: assigning virtual addresses in such a manner that the independent virtual address space of the transfer means includes addresses mutually overlapped with virtual address spaces of the other transfer means.

According to an embodiment of the present invention, there is provided a storage medium storing a computer readable program for an information processing apparatus. The information processing apparatus includes: processor means for executing an operation; storage means for storing an instruction or data necessary for the processor means to execute the operation; a plurality of transfer means for transferring the instruction or data between the processor means and the storage means; and at least one address translation means for translating a virtual address designated by the processor means into a physical address of the storage means. Each of the transfer means includes an independent virtual address space including.addresses, which is mutually overlapping with virtual address spaces of the other transfer means; and the address translation means includes a translation step of translating the virtual address space of the transfer means into a single physical address space.

The storage medium may further include the step of assigning virtual addresses in such a manner that the independent virtual address space of the transfer means includes addresses mutually overlapped with virtual address spaces of the other transfer means.

According to an embodiment of the present invention, there is provided a program for causing an information processing apparatus to execute. The information processing apparatus includes: processor means for executing an operation; storage means for storing an instruction or data necessary for the processor means to execute the operation; a plurality of transfer means for transferring the instruction or data between the processor means and the storage means; and at least one address translation means for translating a virtual address designated by the processor means into a physical address of the storage means. Each of the transfer means includes an independent virtual address space including addresses, which is mutually overlapping with virtual address spaces of the other transfer means; and the address translation means includes a translation step of translating the virtual address space of the transfer means into a single physical address space.

The program may further comprise the step of assigning virtual addresses in such a manner that the independent virtual address space of the transfer means includes addresses mutually overlapped with virtual address spaces of the other transfer means.

An imaging apparatus according to an embodiment of the present invention includes: imaging means for taking an image of an object; encoding means for encoding image data of the object taken with the imaging means; processor means for executing an operation of designating an instruction or data necessary for the encoding means to encode the image data; and storage means for storing the instruction or data necessary for the processor means to execute an operation. The imaging apparatus further include: a plurality of transfer means for transferring the instruction or data between the processor means and the storage means; and at least one address translation means for translating a virtual address designated by the processor means into a physical address of the storage means. Each of the transfer means includes an independent virtual address space including addresses, which is mutually overlapping with virtual address spaces of the other transfer means; the address translation means translates the virtual address space of the transfer means into a single physical address space; and the encoding means encodes the image data in accordance with the instruction or data in the storage means corresponding to an address designated by the processor means and translated by the address translation means.

According to the embodiments of the present invention, the virtual address space having addresses mutually overlapped with another virtual address space is translated into a single physical address space.

According to an embodiment of the present invention, there is provided an information processing apparatus including a processor for executing an operation and a storage for storing an instruction or data for the processor to execute the operation, the information processing apparatus including: a plurality of transfer sections for transferring the instruction or data between the processor and the storage; and at least one address translator for translating a virtual address designated by the processor into a physical address of the storage. Each of the transfer section includes an independent virtual address space including addresses, which is mutually overlapping with virtual address spaces of the other transfer section; and the address translator translates the virtual address space of the transfer section into a single physical address space.

According to an embodiment of the present invention, there is provided an imaging apparatus including: an imaging section for taking an image of an object; an encoder for encoding image data of the object taken with the imaging section; a processor for executing an operation of designating an instruction or data for the encoder to encode the image data; and a storage for storing the instruction or data for the processor to execute an operation. The imaging apparatus further includes: a plurality of transfer sections for transferring the instruction or data between the processor and the storage; and at least one address translator for translating a virtual address designated by the processor into a physical address of the storage. Further, each of the transfer section includes an independent virtual address space including addresses, which is mutually overlapping with virtual address spaces of the other transfer section; the address translator translates the virtual address space of the transfer section into a single physical address space; and the encoder encodes the image data in accordance with the instruction or data in the storage corresponding to an address designated by the processor and translated by the address translation section.

According to the present invention, the data access efficiency and an instruction execution speed may be improved. Further, according to the present invention, unnecessary memory areas may be reduced.

BRIEF DESCRIPTION OF THE DRAWINGS

These and other objects, features and advantages of the present invention will become more apparent in light of the following detailed description of a best mode embodiment thereof, as illustrated in the accompanying drawings:

FIG. 24 is a diagram showing an example of the structure of the instruction virtual address space and data virtual address space controlling Step S55 shown in FIG. 23;

FIG. 26 is a diagram showing an example of the structure of a virtual address space in the related art as compared to FIG. 24;

FIG. 28 is a block diagram showing another example of the structure of the information processing apparatus according to an embodiment of the present invention.

DESCRIPTION OF THE PREFERRED EMBODIMENTS

Figure 1:
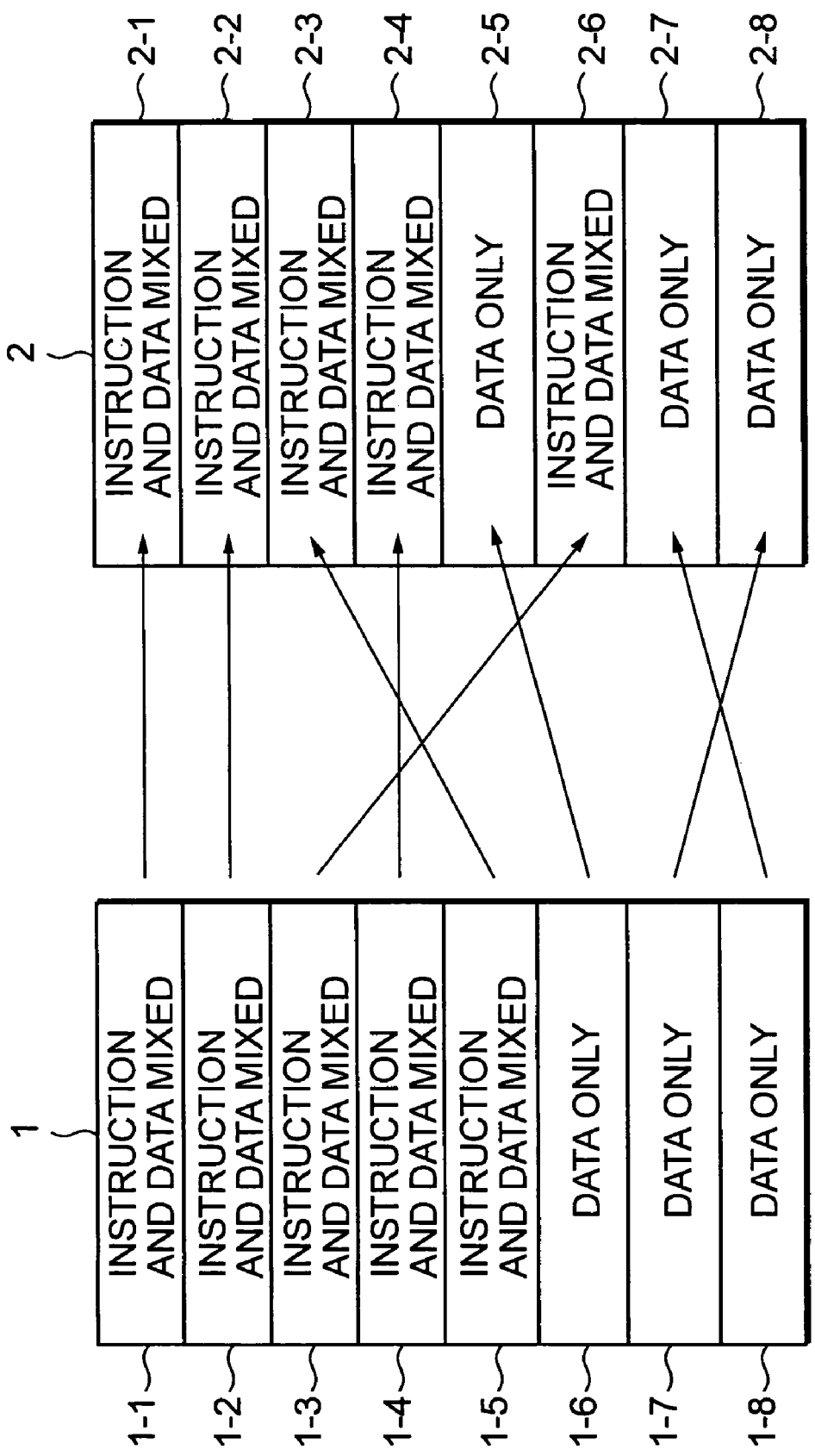
FIG. 1 is a diagram showing an example of the structure of a virtual address space in the related art.
Figure 2:
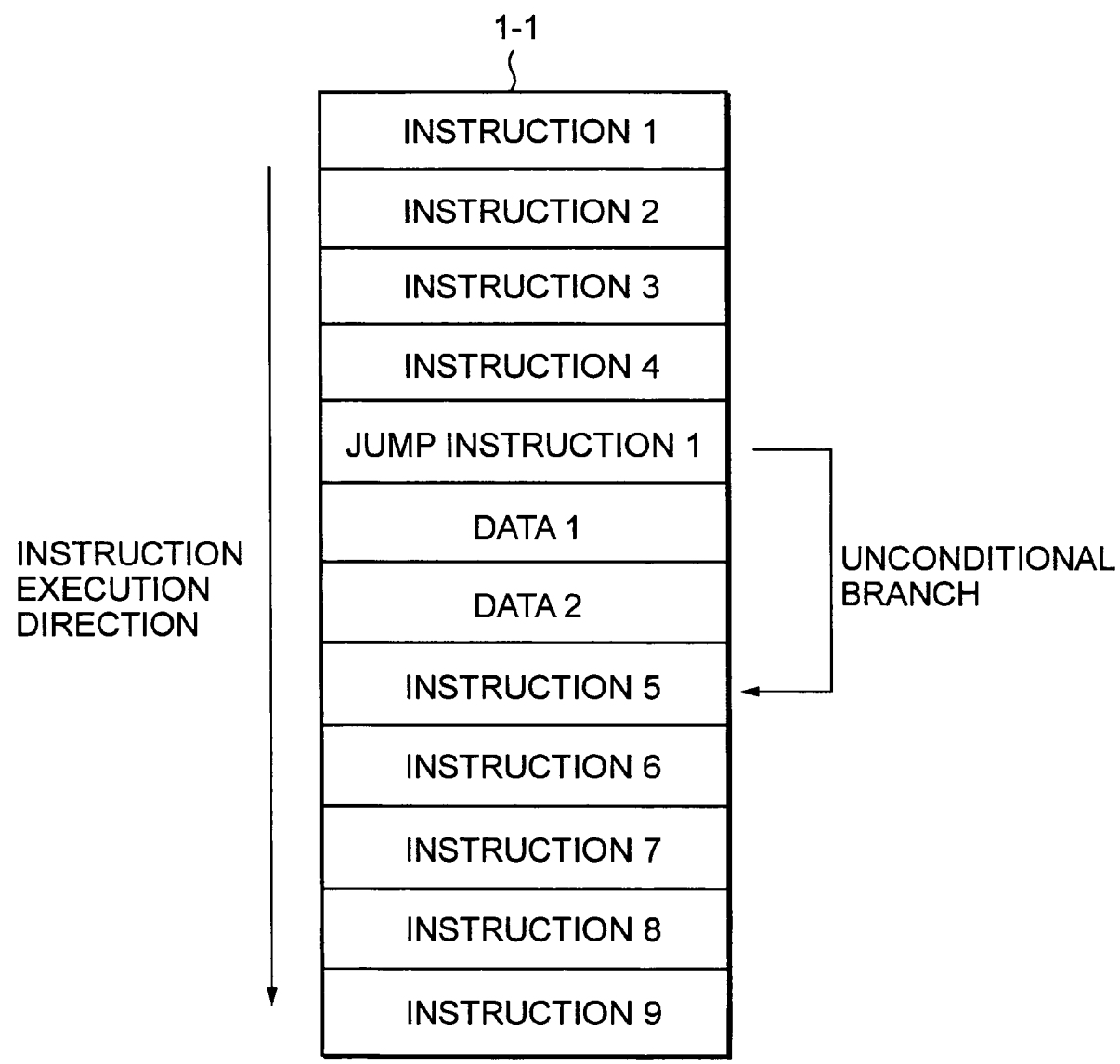
FIG. 2 is a diagram showing an example of the detailed structure of the virtual address space in the related art shown in FIG. 1.
Figure 3:
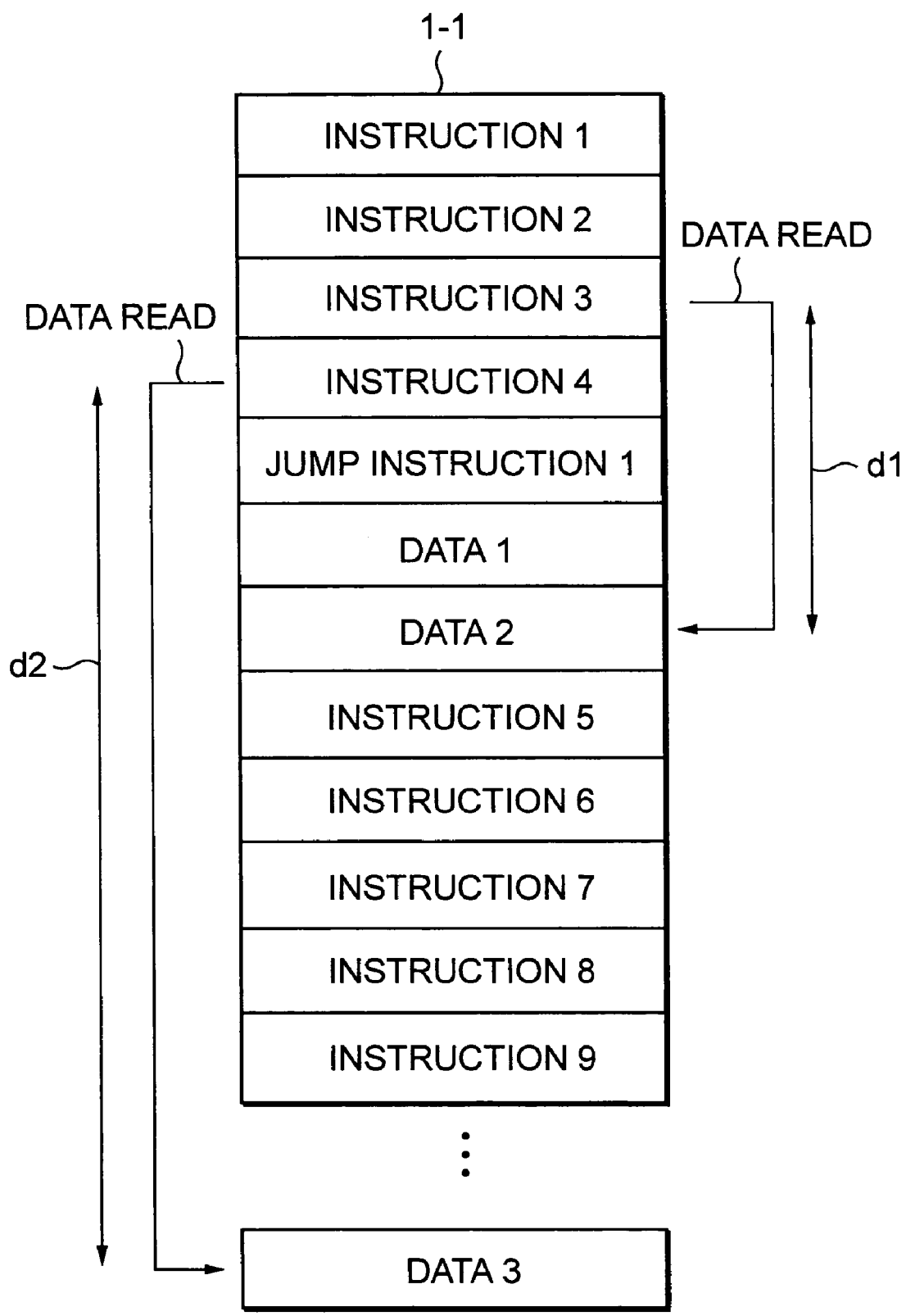
FIG. 3 is a diagram showing another example of the detailed structure of the virtual address space in the related art shown in FIG. 1.
Figure 4:
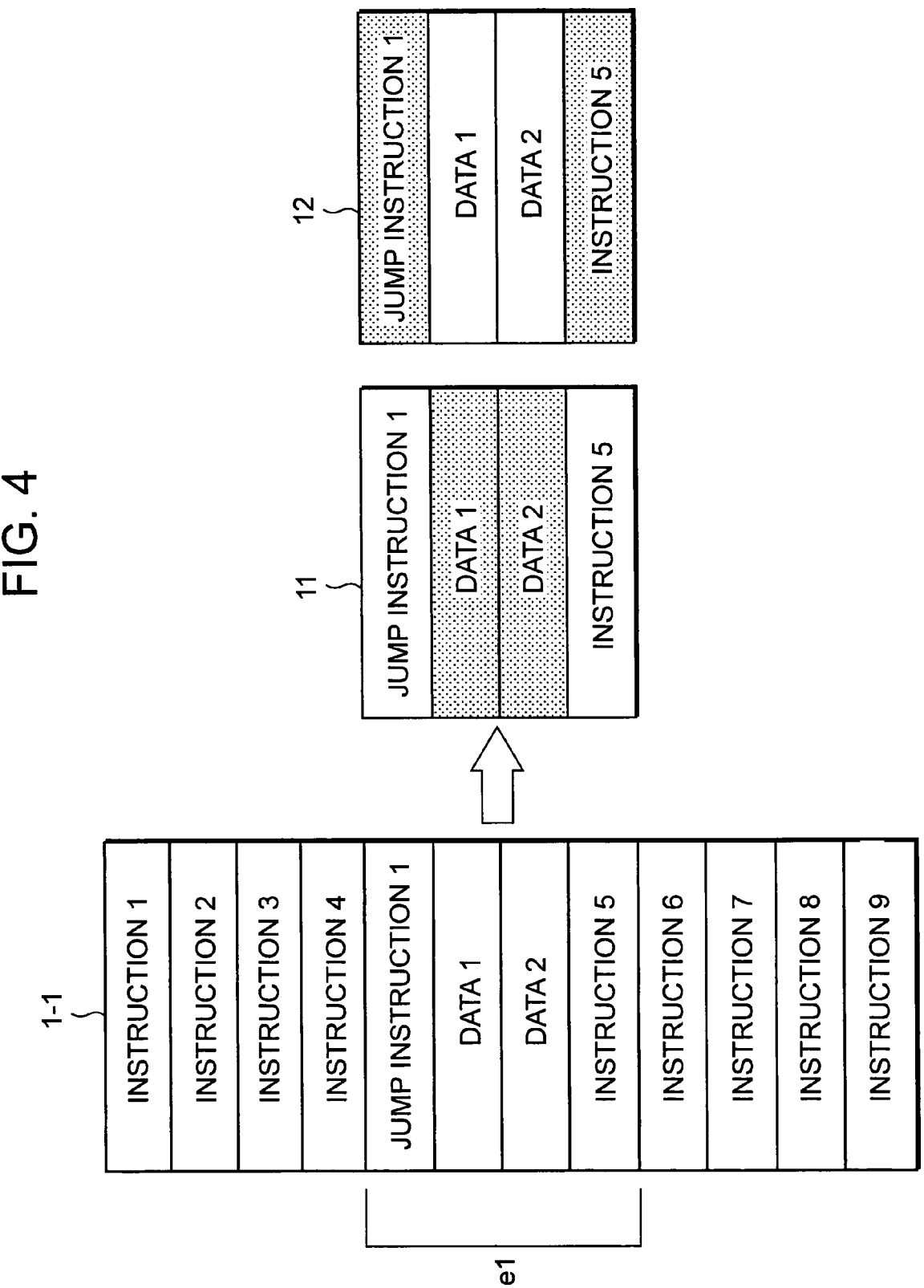
FIG. 4 is a diagram showing an example of the structure of data in caches in the related art.

In the following description of embodiments, correspondence between the invention to be disclosed and the embodiments is as follows. An embodiment described in this specification as not corresponding to the present invention is not intended to mean that such an embodiment does not correspond to the present invention. Conversely, an embodiment described in this specification as corresponding to the present invention is not intended to mean that such an embodiment does not correspond to another invention different from the present invention.

Further, the description is not intended to cover the entire portion of the present invention described in the specification. In other words, it is not intended to deny the presence of an invention described in this specification but not claimed in this application, i.e., to deny the presence of an invention which may be divisionally submitted in the future, or an invention emerging through amendments and additionally submitted in the future.

According to an embodiment of the present invention, an information processing apparatus is provided. The information processing apparatus includes processor means for executing an operation and storage means for storing an instruction or data necessary for the processor means to execute the operation. The information processing apparatus (e.g., information processing apparatus 51 shown in FIG. 54) having processor means (e.g., CPU 61 shown in FIG. 5) for executing an operation and storage means (e.g., memory 62 shown in FIG. 5) for storing an instruction or data necessary for the processor means to execute the operation, includes: a plurality of transfer means (e.g., instruction but 71 and data bus 72 shown in FIG. 5) for transferring the instruction or data between the processor means and the storage means; and at least one address translation means (e.g., instruction address translation unit 71 of data address translation unit 66 shown in FIG. 5) for translating a virtual address designated by the processor means into a physical address of the storage means. Each of the transfer means (e.g., instruction bus 71 shown in FIG. 5) includes an independent virtual address space (e.g., instruction virtual address space 101 shown in FIG. 6) including addresses, which is mutually overlapping with virtual address spaces (e.g., virtual address space 102 shown in FIG. 6) of the other transfer means (e.g., data bus 72 shown in FIG. 5); and the address translation means (e.g., instruction virtual address space 101 shown in FIG. 6) translates the virtual address space of the transfer means into a single physical address space (e.g., physical address space 103 shown in FIG. 7).

The information processing apparatus may further include a cache (e.g., instruction cache 63 shown in FIG. 5) provided for each of the transfer means, the cache using the virtual address as a tag.

In the information processing apparatus, the virtual address space (e.g., virtual address space 121 shown in FIG. 11) may includes virtual addresses in such a manner that a border between a virtual address of the instruction and a virtual address of the data becomes a line border of the cache.

Figure 7:
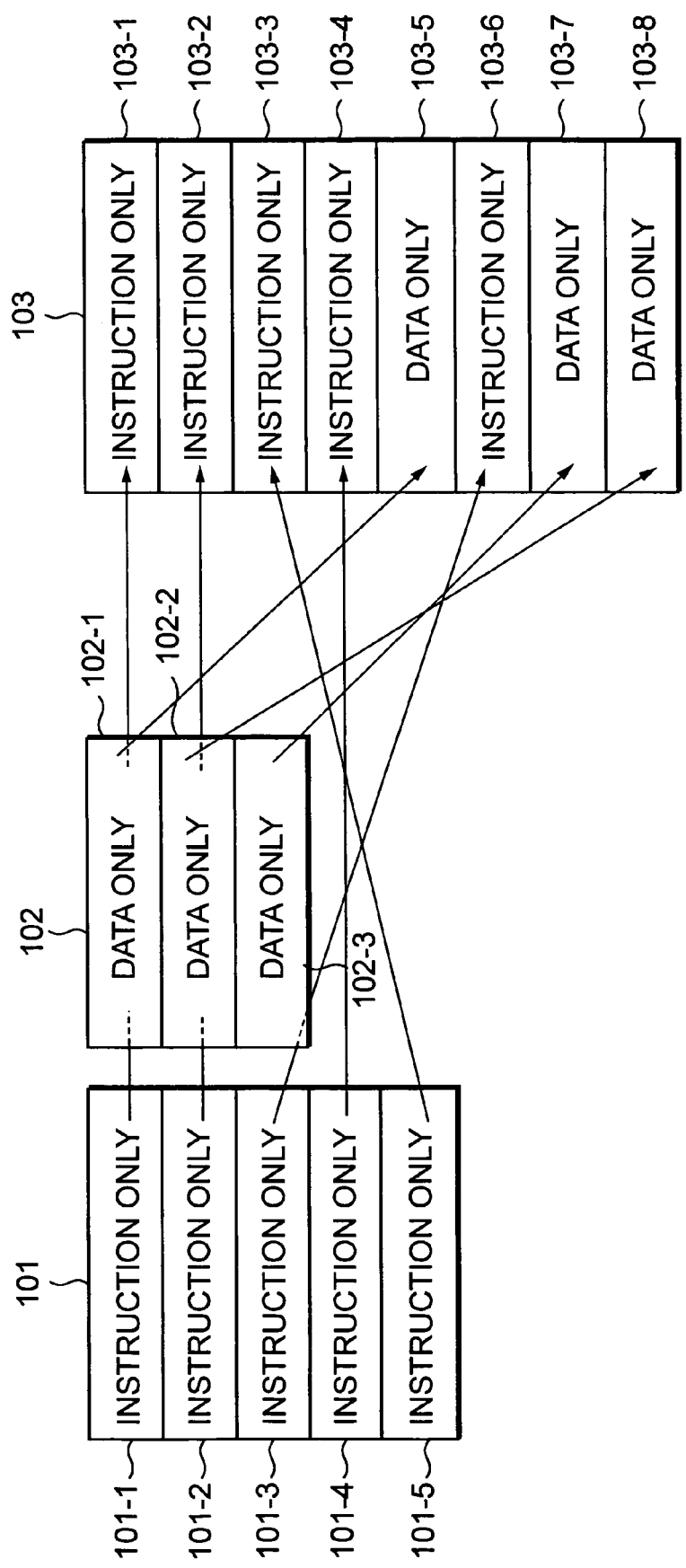
FIG. 7 is a diagram showing an example of the detailed structure of the instruction virtual address space and data virtual address space shown in FIG. 6.

In the information processing apparatus, the address translation means translates the virtual address space of the transfer means into the single physical address space having mutually non-overlapping addresses (e.g., physical address space 103 shown in FIG. 7).

In the information processing apparatus, the storage means may includes a write inhibited area (e.g., address area 161 of ROM shown in FIG. 13) and a write permitted area (e.g., address area 162 of RAM shown in FIG. 13), and virtual addresses of both the write inhibited area and the write permitted area may be disposed in a virtual address space (e.g., data virtual address space 151 shown in FIG. 13) in a range where an operand of an instruction accompanying an access to the storage means can directly designate as a relative address.

In the information processing apparatus, the storage means may includes at least one input/output (I/O) register, and a difference between a virtual address (e.g., instruction virtual address space 252 shown in FIG. 19) of the instruction accompanying an access to the I/O register and a virtual address (e.g., data virtual address space 253 shown in FIG. 19) representative of the I/O register may be equal to or shorter than a distance that can be directly designated by an operand of the instruction as a relative address.

Figure 19:
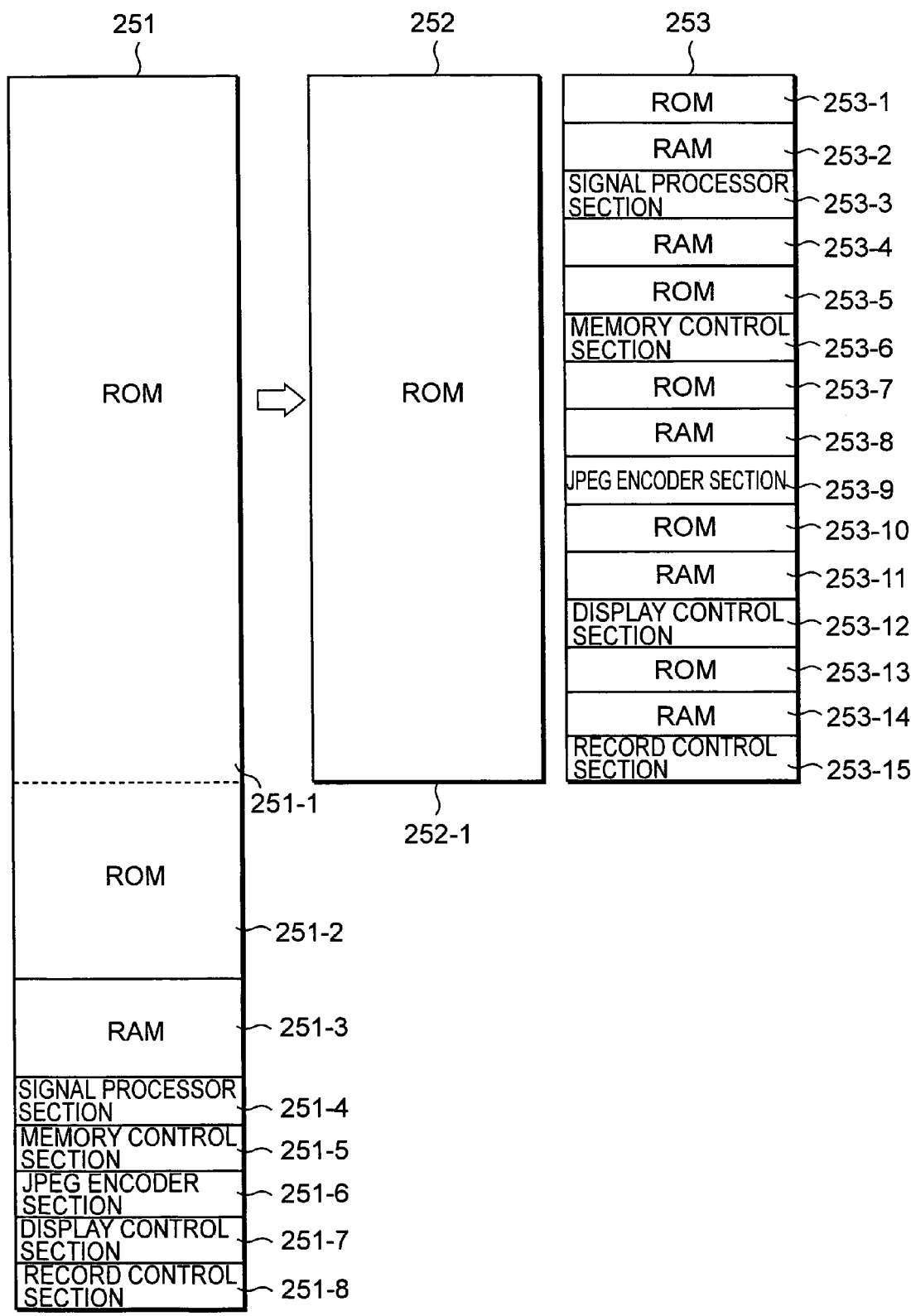
FIG. 19 is a diagram showing an example of the structure of an instruction virtual address space and a data virtual address space of the imaging apparatus shown in FIG. 17.

In the information processing apparatus, a virtual address representative of a same I/O register is divided and disposed in a plurality of areas of the virtual address space (e.g., data virtual address space 253 shown in FIG. 19).

According to an embodiment of the present invention, an information processing method for an information processing apparatus is provided. In the information processing method, the information processing apparatus includes: processor means (e.g., CPU 61 shown in FIG. 5) for executing an operation; storage means (e.g., memory 62 shown in FIG. 5) for storing an instruction or data necessary for the processor means to execute the operation; a plurality of transfer means (e.g., instruction bus 71 and data bus 72 shown in FIG. 5) for transferring the instruction or data between the processor means and the storage means; and at least one address translation means (e.g., instruction address translation unit 64 or data address translation unit 66 shown in FIG. 5) for translating a virtual address designated by the process or means into a physical address of the storage means. Each of the transfer means (e.g., instruction bus 71 shown in FIG. 5) includes an independent virtual address space (e.g., instruction virtual address space 101 shown in FIG. 6) including addresses, which is mutually overlapping with virtual address spaces (e.g., data virtual address space 102 shown in FIG. 6) of the other transfer means (e.g., data bus 72 shown in FIG. 5); and the address translation means (e.g., instruction address translation unit 64 shown in FIG. 5) includes a translation step (e.g., Steps S13 and S14 shown in FIG. 16) of translating the virtual address space (e.g., instruction virtual address space 101 shown in FIG. 5) of the transfer means into a single physical address space (e.g., physical address space 103 shown in FIG. 7).

According to an embodiment of the present invention, an imaging apparatus (e.g., imaging apparatus 201 shown in FIG. 17) is provided. The imaging apparatus includes: imaging means (e.g., CCD 215 shown in FIG. 17) for taking an image of an object; encoding means (e.g., JPEG encoder unit 223 shown in FIG. 17). for encoding image data of the object taken with the imaging means; processor means (e.g., CPU 61 shown in FIG. 18) for executing an operation of designating an instruction or data necessary for the encoding means to encode the image data; and storage means (e.g., ROM 212, RAM 213 or I/O register 231 shown in FIG. 18) for storing the instruction or data necessary for the processor means to execute an operation. The imaging apparatus further includes: a plurality of transfer means (e.g., instruction bus 71 and data bus 72 shown in FIG. 18) for transferring the instruction or data between the processor means and the storage means; and at least one address translation means (e.g., instruction address translation unit 64 or data address translation unit 66 shown in FIG. 18) for translating a virtual address designated by the process or means into a physical address of the storage means. Each of the transfer means (e.g., instruction bus 71 shown in FIG. 18) includes an independent virtual address space (e.g., instruction virtual address space 252 shown in FIG. 19) including addresses, which is mutually overlapping with virtual address spaces (e.g., data virtual address space 253 shown in FIG. 19) of the other transfer means (e.g., data bus 72 shown in FIG. 18); the address translation means (e.g., instruction address translation unit 64 shown in FIG. 18) includes a translation step of translating the virtual address space (e.g., instruction address translation unit 64 shown in FIG. 18) of the transfer means into a single physical address space (e.g., physical address space 251 shown in FIG. 19); and the encoding means encodes the image data in accordance with the instruction or data in the storage means corresponding to an address designated by the processor means and translated by the address translation means.

The storage medium and program according to embodiments of the present invention have basically the same configuration as that of the information processing method described above, and so the description thereof is omitted in order to avoid duplications.

Embodiments of the present invention will be described with reference to the accompanying drawings.

Figure 5:
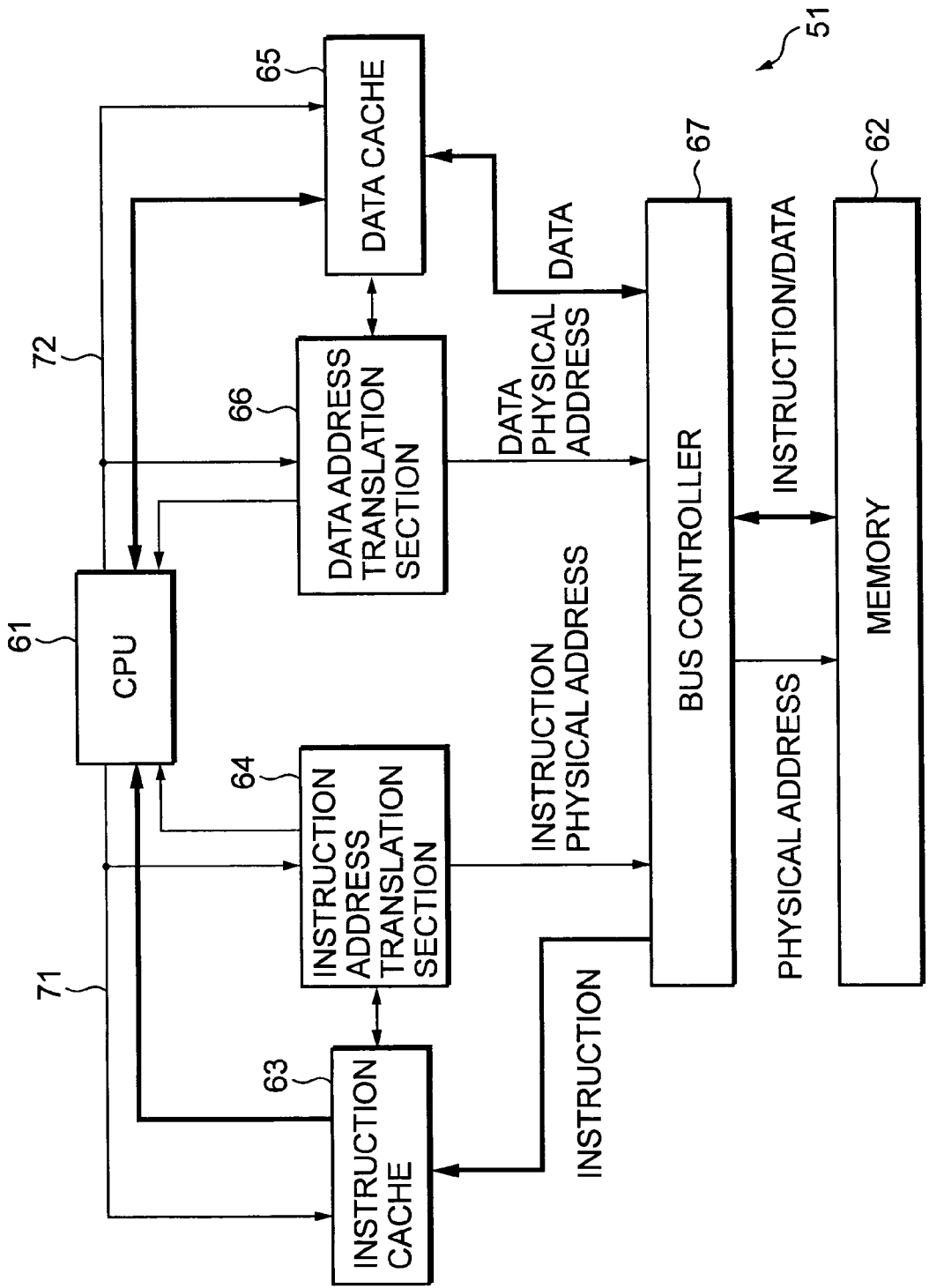
FIG. 5 is a block diagram showing an example of the structure of an information processing apparatus according to an embodiment of the present invention.

FIG. 5 is a block diagram showing an example of the structure of an information processing apparatus 51 according to an embodiment of the present invention. A central processing unit (CPU) 61 acquires instructions and data stored in a memory 62 and performs various arithmetic calculations in accordance with the acquired instructions and data. In the example shown in FIG. 5, the information processing apparatus 51 has an instruction bus 71 for transferring an instruction from the CPU 61 and a data bus 72 for transferring data from the CPU 61, the instruction and data buses being separated. As will be later described with reference to FIG. 6, an instruction virtual address space 101 for the instruction bus 71 and a data virtual address space 102 for the data bus 72 are provided independently.

The memory 62 includes a read only memory (ROM), a random access memory (RAM) and the like, and stores therein instructions, data and the like to be used by the CPU 61 for its arithmetic calculations.

If the CPU 61 acquires an instruction, it looks at the memory 62 through the instruction virtual address space 101 to designate a virtual address of the instruction. The CPU 61 outputs the designated instruction virtual address to an instruction cache 63 and an instruction address translation unit 64 via the instruction bus 71. If the CPU 61 acquires data, it looks at the memory 62 through the data virtual address space 102 to designate a virtual address of the data. The CPU 61 outputs the designated data virtual address to a cache 65 and a data address translation unit 66 via the data bus 72. Each data includes a constant, a variable, a register address and the like.

The instruction cache 63 stores temporarily instructions each having an arbitrary capacity (e.g., cache line units such as 16 bytes and 32 bytes) and output from a bus controller 67, by using virtual addresses as tags. The instruction cache 63 refers to the tags in the instruction cache 63 to judge whether the virtual address input via the instruction bus 71 is coincident with the virtual address of the instruction recorded by the tag in the instruction cache 63. If it is judged that the input virtual address is coincident with the virtual address of the instruction recorded by the tag in the instruction cache 63, then the instruction having the coincident virtual address is output to the CPU 61 via the instruction bus 71.

If the instruction cache 63 judges that the input virtual address is not coincident with the virtual address of the instruction recorded by the tag in the instruction cache 63, then the instruction address translation unit 64 translates the virtual address input via the instruction bus 71 into the physical address in the memory 62 and outputs it to the bus controller 67.

The data cache 65 stores temporarily data sets each having an arbitrary capacity (e.g., cache line units such as 16 bytes and 32 bytes), by using virtual addresses as tags. The data cache 65 refers to the tags in the data cache 65 to judge whether the virtual address input via the data bus 72 is coincident with the virtual address of the data recorded by the tag in the data cache 65. If it is judged that the input virtual address is coincident with the virtual address of the data recorded by the tag in the data cache 65, then the data having the coincident virtual address is output to the CPU 61 via the data bus 72.

If the data cache 65 judges that the input virtual address is not coincident with the virtual address of the data recorded by the tag in the data cache 65, then the data address translation unit 66 translates the virtual address input via the data bus 72 into the physical address in the memory 62 and outputs it to the bus controller 67.

The instruction address translation unit 64 and data address translation unit 66 (or may be one of them) controls the read/write access right of the memory 62 in the unit of address translation. If a write instruction or the like is input from the CPU 61 and if the corresponding virtual address indicates a write inhibited (read only) area, an exception signal or the like is notified to the CPU 61.

The bus controller 67 acquires the instruction corresponding to the physical address supplied from the instruction address translation unit 64, from the memory 62, and outputs it to the CPU 61 via the instruction cache 63 and instruction bus 71. Similarly, the bus controller 67 acquires the data corresponding to the physical address supplied from the data address translation unit 66, from the memory 62, and outputs it to the CPU 61 via the data cache 65 and data bus 72.

In the information processing apparatus 51, although both the instruction cache 63 and data cache 65 are provided independently in correspondence with the instruction bus 71 and data bus 72, a single cache may be used. In this case, the cache distinguishes between the instruction and data supplied via the instruction bus 71 and data bus 72 and stores temporarily the instructions and data having an arbitrary capacity.

Figure 6:
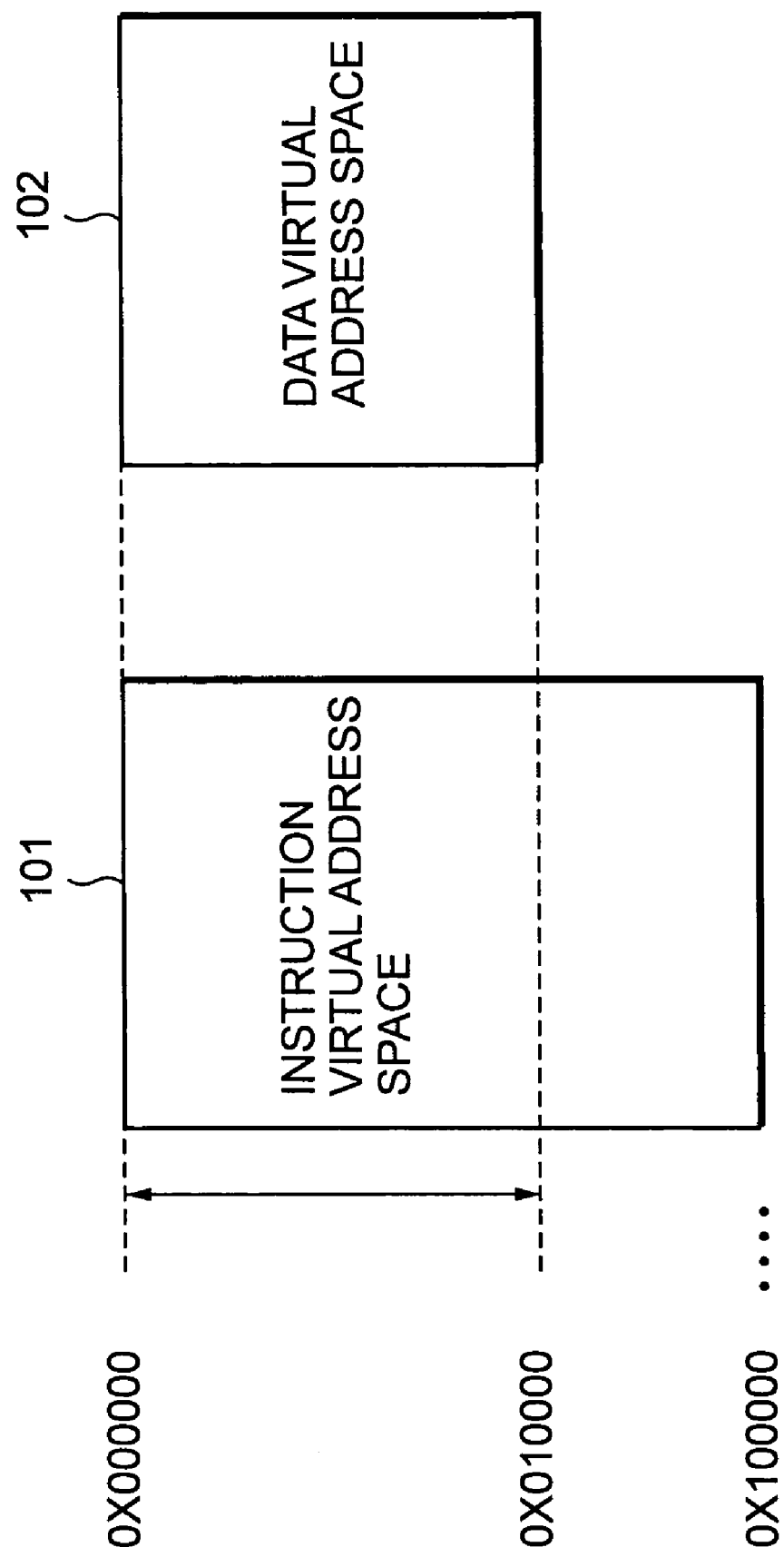
FIG. 6 is a diagram showing an example of the structure of an instruction virtual address space and a data virtual address space of the information processing apparatus shown in FIG. 5.

FIG. 6 is a diagram showing an example of the construction of virtual address spaces used by the information processing apparatus 51 shown in FIG. 5. In the example shown in FIG. 6, the virtual address spaces are independent each other, and include the instruction virtual address space 101 for the instruction bus 71 and the data virtual address space 102 for the data bus 72.

The instruction virtual address space 101 and data virtual address space 102 use the virtual addresses partially overlapped. For example, the instruction virtual address space 101 uses the virtual addresses from "0x000000" to "0x10000" and the data virtual address space 102 uses the virtual addresses from "0x000000" to "0x01000". The virtual addresses from "0x000000" to "0x010000" are duplicately used by the instruction virtual address space 101 and data virtual address space 102.

With reference to FIG. 7 description will be made on a correspondence among the instruction address space 101 and data virtual address space 102 constructed as above and a physical address space 103 which is the address space of the actual memory 62. In the instruction virtual address space 101 and data virtual address space 102, it is assumed that the areas on the same row as counted from the top row use the same virtual address.

In the example shown in FIG. 7, the physical address space 103 includes: in the order of address (ascending order of address), address areas 103-1 to 103-4 where pages of only instructions are stored; an address area 103-5 where pages of only data are stored; an address area 103-6 where pages of only instructions are stored; and address regions 103-7 and 103-8 where pages of only data are stored. Each address area is structured in the unit of page size (address translation) which is the minimum address translation unit (e.g., 4 KB).

The instruction virtual address space 101 includes only the virtual addresses corresponding to the physical addresses of the address areas where pages of only instructions are stored in the physical address space 103. Namely, the instruction virtual address space 101 includes: an address area 101-1 disposed at which is the virtual address corresponding to the address area 103-1 where pages of only instructions are stored; an address area 101-2 disposed at which is the virtual address corresponding to the address area 103-2 where pages of only instructions are stored; an address area 101-3 disposed at which is the virtual address corresponding to the address area 103-6 where pages of only instructions are stored; an address area 101-4 disposed at which is the virtual address corresponding to the address area 103-4 where pages of only instructions are stored; and an address area 101-5 disposed at which is the virtual address corresponding to the address area 103-3 where pages of only instructions are stored.

The data virtual address space 102 includes only the virtual addresses corresponding to the physical addresses of the address areas where pages of only data are stored in the physical address space 103. Namely, the data virtual address space 102 includes: an address area 102-1 disposed at which is the virtual address corresponding to the address area 103-5 where pages of only data are stored; an address area 102-2 disposed at which is the virtual address corresponding to the address area 103-8 where pages of only data are stored; and an address area 102-3 disposed at which is the virtual address corresponding to the address area 103-7 where pages of only data are stored.

The instruction address translation unit 64 stores therein a correspondence between the instruction virtual address space 101 and physical address space 103, as an instruction address translation table. The data address translation unit 66 stores therein a correspondence between the data virtual address space 102 and physical address space 103, as a data address translation table.

For example, if the CUP 61 designates the virtual address corresponding to pages of only instructions in the address area 101-1, the instruction address translation unit 64 translates the virtual address into the physical address of the address area 103-1 by referring to the instruction address translation table. In this manner, the CPU 61 can acquire the instruction corresponding to the physical address in the address area 103-1.

Similarly, for example, if the CUP 61 designates the virtual address corresponding to pages of only data in the address area 102-1, the data address translation unit 66 translates the virtual address into the physical address of the address area 103-5 by referring to the data address translation table. In this manner, the CPU 61 can acquire the data corresponding to the physical address in the address area 103-5.

As above, by using two address translation tables, even if the instruction virtual address space 101 and data virtual address space 102 use duplicated virtual addresses, the virtual address of the instruction virtual address space 101 and data virtual address space 102 can be translated into a predetermined single and not duplicated address of the physical address space 103.

The instruction address translation unit 64 and data address translation unit 66 translate the virtual address duplicately used by the instruction virtual address space 101 and data virtual address space 102 into a single physical address in the physical address space 103 by using the instruction and data translation tables. Instead, address translation may be performed by using a single address translation unit and two address translation tables, by additionally using identifiers for distinguishing between the virtual address input from the instruction bus 71 and the virtual address input from the data bus 72.

As above, since the instruction virtual address space 101 and data virtual address space 102 are provided independently, instructions and data can be completely separated in the virtual address spaces. Therefore, the data and the instruction using the data can be allocated at the virtual addresses nearer each other than those shown in the virtual address space in FIG. 1 (or at the same virtual address) Even if the data such as a long constant to be used by an instruction is to be stored separately from the instruction, the data is allocated to the data virtual address space 102. Therefore, the jump instruction 1 described with reference to FIG. 1 is not necessary in the instruction virtual address space 101, and it is possible to suppress the number of wasteful instructions from being increased.

Figure 8:
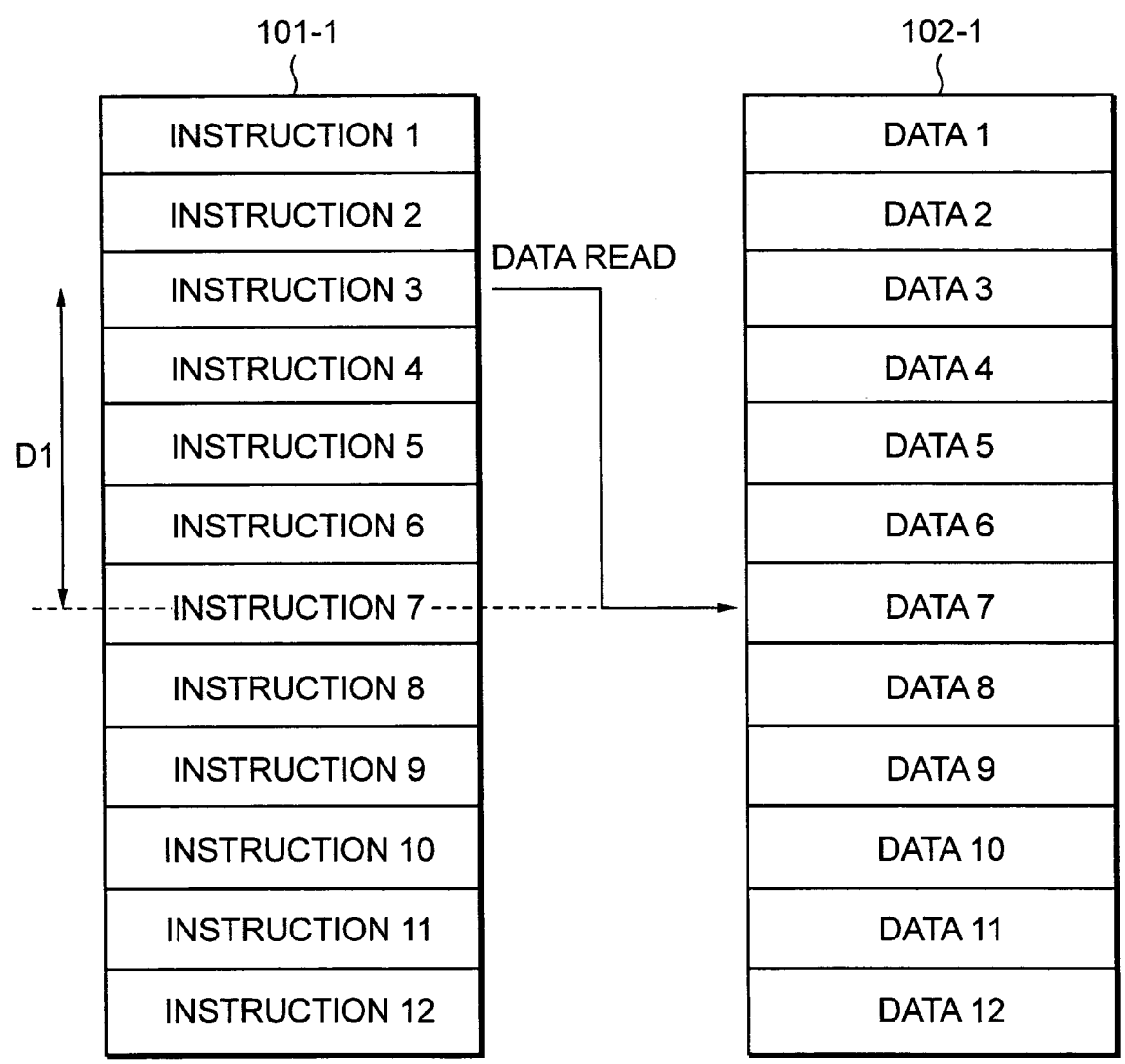
FIG. 8 is a diagram showing an example of the more detailed structure of the instruction virtual address space and data virtual address space shown in FIG. 7.

FIG. 8 is a diagram showing an example of the structure of the address areas 101-1 and 102-1 in the address translation unit of the instruction virtual address space 101 and data virtual address space 102 shown in FIG. 7. In the instruction virtual address space 101 and data virtual address space 102, it is assumed that the areas on the same row as counted from the top row use the same virtual address.

In the example shown in FIG. 8, the address area 101-1 of the instruction virtual address space 101 includes the virtual addresses corresponding to instructions 1 to 12 (virtual addresses for storing the instructions 1 to 12), and the data area 102-1 of the data virtual address space 102 includes the virtual addresses corresponding to data 1 to 12 (virtual addresses for storing the data 1 to 12).

Strictly speaking, if the CPU 61 designates a virtual address, the instruction or data corresponding to the designated virtual address is output to the CPU 61 if the instruction or data is in the instruction cache 63 or data cache 65. If the instruction or data is not in the instruction cache 63 or data cache 65, the instruction address translation unit 64 or data address translation unit 66 translates the virtual address into the physical address, and then the bus controller 67 reads the instruction or data (instruction or data stored at the physical address) from the memory 62 and outputs it to the CPU 61. However, for the description conveniences, in this specification, description will be made such as, "if the CPU 61 designates a virtual address, the instruction or data corresponding to the virtual address is read and the instruction is executed".

In the example shown in FIG. 8, the CPU 61 designates the virtual address of an instruction 3 and executes the instruction 3 for reading, for example, data 7. In this case, since the separates address spaces are used for the instructions and data and the instruction virtual address space 101 and data virtual address space 102 use duplicated virtual addresses, the virtual address for the data 7 to be read by the instruction 3 can be set to the virtual address at a distance D1 where the operand of the instruction 3 can designate. Accordingly, the CPU 61 can designate the virtual address for the data 7 by the operand of the instruction 3 to read directly the data 7.

As above, since the instruction virtual address space 101 and data virtual address space 103 use duplicated virtual addresses, the chances become quite frequent that the virtual address for the data to be designated by the instruction can be set to the virtual address at the distance from the virtual address for the instruction where the operand of the instruction can designate. It is therefore possible to avoid the case in which the relative address of the data designated by the instruction is required to be once held at the distance where the operand can designate.

Figure 9:
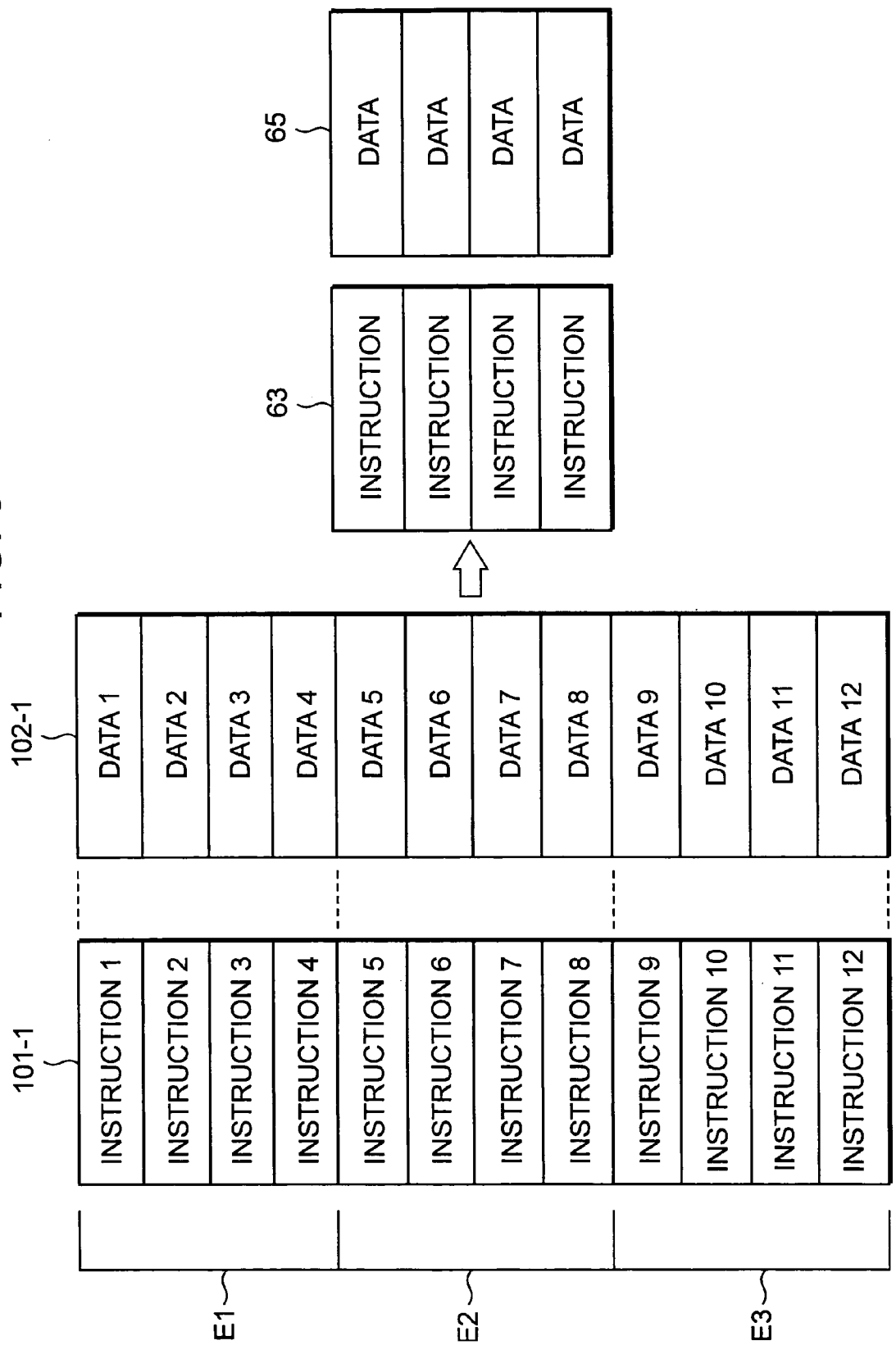
FIG. 9 is a diagram showing an example of data in an instruction cache and in a data cache shown in FIG. 5 and applied to the example shown in FIG. 7.

FIG. 9 is a diagram showing an example of the structure of instructions and data in the instruction cache 63 and data cache 65 shown in FIG. 5. In FIG. 9, elements corresponding to those shown in FIG. 8 are represented by identical reference symbols and the duplicated description thereof is omitted.

In the example shown in FIG. 9, in the address field 101-1 of the instruction virtual address space 101, a range E1 of instructions 1 to 4 indicates the range of instructions to be registered in the instruction cache 63 if the CPU 61 designates the virtual address for the instruction 1 in the address area 101-1. A range E2 of instructions 5 to 8 indicates the range of instructions to be registered in the instruction cache 63 if the CPU 61 designates the virtual address for the instruction 5 in the address area 101-1. A range E3 of instructions 9 to 12 indicates the range of instructions to be registered in the instruction cache 63 if the CPU 61 designates the virtual address for the instruction 9 in the address area 101-1. Since the virtual addresses in the instruction virtual address space 101 are stored only for the instructions 1 to 12, only the instructions are registered in the instruction cache 63.

In the address field 102-1 of the data virtual address space 102, the range E1 of data 1 to 4 indicates the range of data to be registered in the data cache 65 if the CPU 61 designates the virtual address for the data 1 in the address area 101-1. The range E2 of data 5 to 8 indicates the range of instructions to be registered in the data cache 65 if the CPU 61 designates the virtual address for the data 5 in the address area 101-1. The range E3 of data 9 to 12 indicates the range of data to be registered in the data cache 65 if the CPU 61 designates the virtual address for the data 9 in the address area 101-1. Since the virtual addresses in the data virtual address space 102 are stored only for the data 1 to 12, only the data is registered in the data cache 65.

As above, data will not be registered in the instruction cache 63, whereas instructions will not be registered in the data cache 65. Accordingly, the instruction cache 63 and data cache 65 can use efficiently the precious memory area.

In the example shown in FIG. 7, the instruction virtual address space 101 includes the virtual addresses corresponding to pages of only instructions, the data virtual address space 102 includes the virtual addresses corresponding to pages of only data, and the virtual address of the instruction virtual address space 101 and data virtual address space 102 is translated into a predetermined address of the single and not duplicated physical address space 103. In this case, as shown in FIG. 10, an empty area may occur in some cases.

Figure 10:
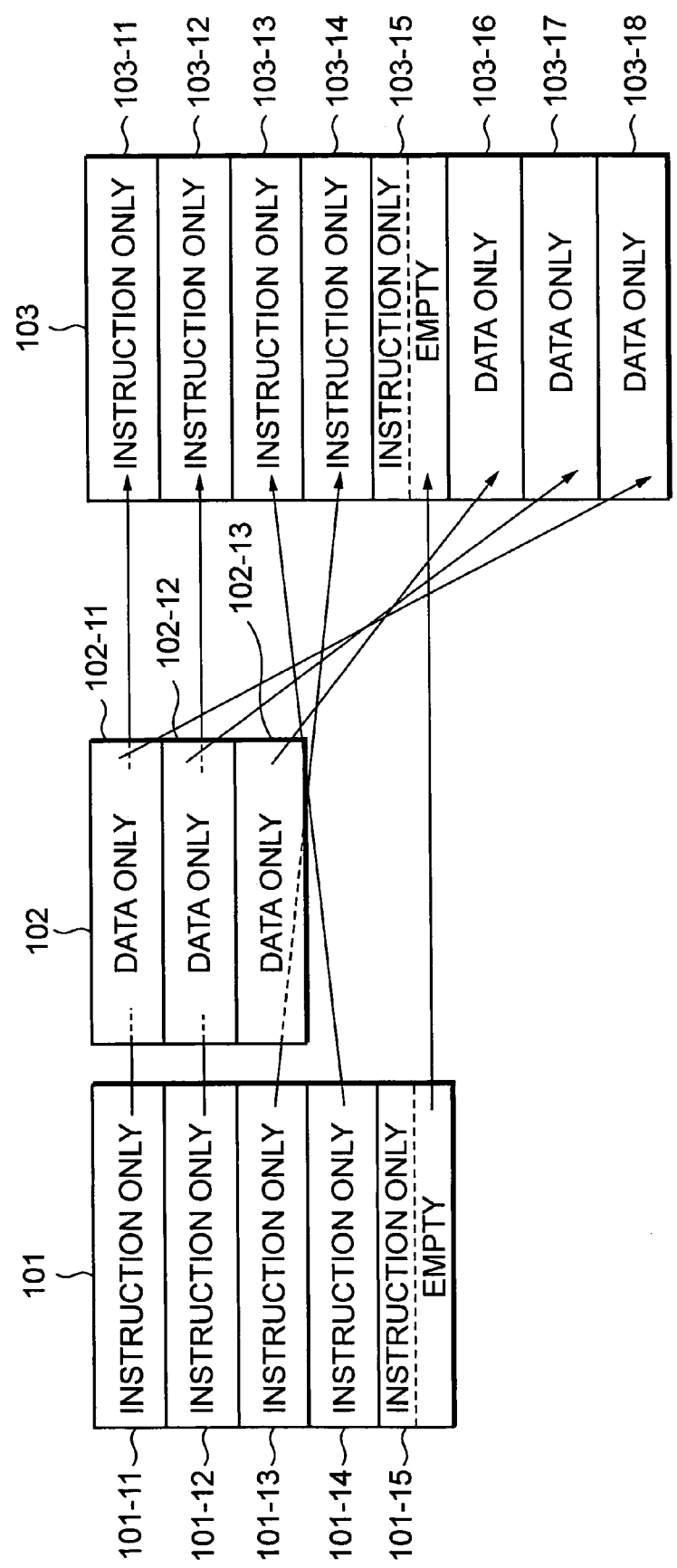
FIG. 10 is a diagram showing another example of the structure of the instruction virtual address space and data virtual address space shown in FIG. 7.

FIG. 10 is a diagram showing another example of the correspondence among the instruction virtual address space 101, data virtual address space 102 and physical address space 103 shown in FIG. 7. In FIG. 10, elements corresponding to those shown in FIG. 7 are represented by identical reference symbols and the duplicated description thereof is omitted.

In the example shown in FIG. 10, the physical address space 103 includes: in the order of address (ascending order of address), address areas 103-11 to 103-14 where pages of only instructions are stored; an address area 103-15 including an area where pages of only instructions are stored and an empty area; and address areas 103-16 to 103-18 where pages of only data are stored.

The instruction virtual address space 101 includes: an address area 101-11 disposed at which is the virtual address corresponding to the address area 103-11 where pages of only instructions are stored; an address area 101-12 disposed at which is the virtual address corresponding to the address area 103-12 where pages of only instructions are stored; an address area 101-13 disposed at which is the virtual address corresponding to the address area 103-14 where pages of only instructions are stored; an address area 101-14 disposed at which is the virtual address corresponding to the address area 103-13 where pages of only instructions are stored; and an address area 101-14 disposed at which is the virtual address corresponding to the address area 103-15 where pages of only instructions are stored and an empty area.

The data virtual address space 102 includes: an address area 102-11 disposed at which is the virtual address corresponding to the address area 103-18 where pages of only data are stored; an address area 102-12 disposed at which is the virtual address corresponding to the address area 103-17 where pages of only data are stored; and an address area 102-13 disposed at which is the virtual address corresponding to the address area 103-16 where pages of only data are stored.

In the example shown in FIG. 10, the instruction address translation unit 64 and data address translation unit 66 translate the virtual address in the page unit (address translation unit) into a predetermined address of the single and not duplicated physical address space 103. Therefore, in the physical address space 103, it is necessary that the physical addresses of an instruction and data are divided in the page unit (address translation unit). Namely, as shown in the address area 103-15, in the physical address space 103, the border between an instruction and data is required to be aligned with the border of the page unit (address translation unit), so that an empty area is formed between the physical addresses of the instruction and data. This may require an additional memory in some cases.

Figure 11:
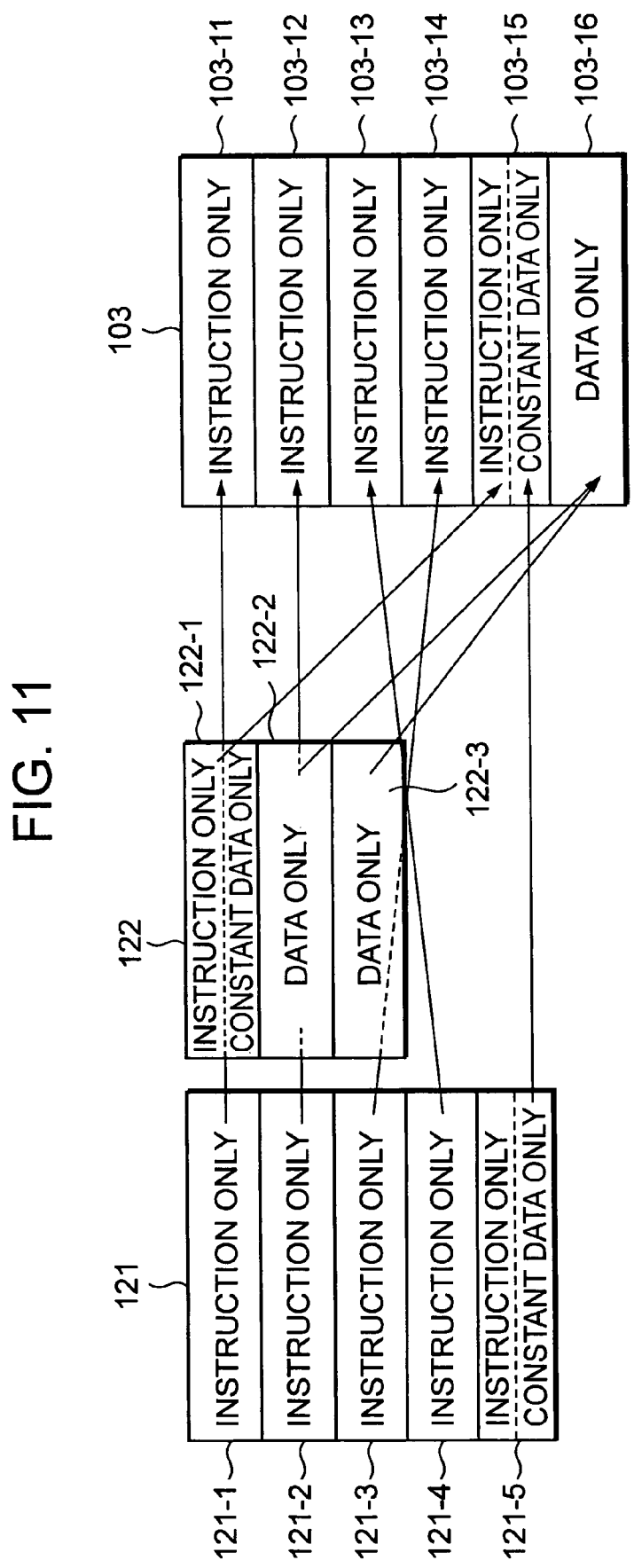
FIG. 11 is a diagram showing still another example of the structure of the instruction virtual address space and data virtual address space shown in FIG. 7.

To avoid this, in the information processing apparatus 51, as shown in FIG. 11 constant data is disposed in the empty area in the address area 103-15 having the border between the instruction and data shown in FIG. 10, to make this address area 103-15 be used by the virtual addresses for both instructions and data.

FIG. 11 is a diagram showing the correspondence among an instruction virtual address space 121, a data virtual address space 122 and the physical address space 103. The instruction virtual address space 121 and data virtual address space 122 shown in FIG. 11 are other examples of the instruction virtual address space 101 and data virtual address space 102 shown in FIG. 7.

In the example shown in FIG. 11, the physical address space 103 includes: in the order of address (ascending order of address), address areas 103-11 to 103-14 where pages of only instructions are stored; an address area 103-15 including an area where pages of only instructions and only data are stored; and an address area 103-16 where pages of only data are stored. In the example shown in FIG. 11, addresses of the constant data are disposed in the empty area of the address area 103-15 having the border between the instruction and data of the physical address space 103 shown in FIG. 10.

The instruction virtual address space 121 includes: an address area 121-1 disposed at which is the virtual address corresponding to the address area 103-11 where pages of only instructions are stored; an address area 121-2 disposed at which is the virtual address corresponding to the address area 103-12 where pages of only instructions are stored; an address area 121-3 disposed at which is the virtual address corresponding to the address area 103-14 where pages of only instructions are stored; an address area 121-4 disposed at which is the virtual address corresponding to the address area 103-13 where pages of only instructions are stored; and an address area 121-5 disposed at which is the virtual address corresponding to the address area 103-15 where pages of only instructions are stored and an empty area. Namely, similar to the instruction virtual address space 101, although the instruction virtual address space 121 is basically including the virtual addresses corresponding to the physical addresses of the address areas where pages of only instructions are stored, it also includes the virtual addresses corresponding to the constant data in the address area having the border between an instruction and data.

The data virtual address space 122 includes: an address area 122-1 disposed at which is the virtual address corresponding to the address area 103-15 where pages of only instructions and data are stored; an address area 122-2 disposed at which is the virtual address corresponding to the address area 103-16 where pages of only data are stored; and an address area 122-3 disposed at which is the virtual address corresponding to the address area 103-16 where pages of only data are stored. Namely, similar to the data virtual address space 102, although the data virtual address space 122 basically includes the virtual addresses corresponding to the physical addresses of the address areas where pages of only data are stored, it also includes the virtual addresses corresponding to the instructions in the address area having the border between an instruction and data.

Similar to the description made by referring to FIG. 7, the instruction address translation unit 64 stores therein a correspondence between the instruction virtual address space 121 and physical address space 103, as an instruction address translation table. The data address translation unit 66 stores therein a correspondence between the data virtual address space 122 and physical address space 103, as a data address translation table.

For example, if CUP 61 designates the virtual address corresponding to pages of only instructions in the address area 121-1, the instruction address translation unit 64 translates the virtual address into the physical address of the address area 103-11 by referring to the instruction address translation table. In this manner, the CPU 61 can acquire the instruction corresponding to the physical address in the address area 103-11. In addition, if CUP 61 designates the virtual address corresponding to pages of only instructions in the address area 121-5, the instruction address translation unit 64 translates the virtual address into the physical address of the address area 103-15 by referring to the instruction address translation table. In this manner, the CPU 61 can acquire the instruction corresponding to the physical address in the address area 103-15.

Similarly, for example, if the CUP 61 designates the virtual address corresponding to pages of only constant data in the address area 122-1, the data address translation unit 66 translates the virtual address into the physical address of the address area 103-15 by referring to the data address translation table. In this manner, the CPU 61 can acquire the constant data corresponding to the physical address in the address area 103-15. In addition, for example, if the CUP 61 designates the virtual address corresponding to pages of only data in the address area 122-2 or if the CPU 61 designates the virtual address corresponding to pages oh only data in the address area 122-3, the data address translation unit 66 translates the virtual address into the physical address of the address area 103-16 by referring to the data address translation table. In this manner, the CPU 61 can acquire the data corresponding to the physical address in the address area 103-16.

Namely, in the example shown in FIG. 11, the address area 121-5 of the instruction virtual address space 121 and the address area 122-1 in the data virtual address space 122 are both translated into the same address area 103-15 of the physical address space 103. The address areas 122-2 and 122-3 are both translated into the same address area 103-16 of the physical address space 103.

As above, the instruction virtual address space and data virtual address space are provided independently, and the same address area (e.g., address area 103-5) of the physical address space 103 is used by the virtual addresses in both the instruction virtual address space and data virtual address space. Therefore, similar to the instruction virtual address space 101 and data virtual address space 102 shown in FIG. 7, the data and the instruction using the data can be allocated at the virtual addresses nearer each other than those shown in the virtual address space in FIG. 1 (or at the same virtual address). Further, in the physical address space 103, instructions and data can be disposed in the same page (address translation) unit so that it is possible to reduce the wasteful area in the memory 69, such as the empty area described above with reference to FIG. 10.

Also in this case, data disposed in the same page unit as that of instructions is only a function address and the constant data such as comparison target constants, as shown in the address area 103-5. Therefore, the instruction address translation unit 64 or data address translation unit 66 can make a read only area the area of pages disposed with instructions and constant data in the memory 62. With this arrangement, even if a buffer overflow not anticipated during programming occurs, at least an arbitrary instruction can be prevented from being executed because variables are not allocated to the instruction virtual address space.

In the physical address space 103 shown in FIG. 11, since a plurality of virtual addresses in the page unit in the data virtual address space 122 (e.g., in the address areas 122-2 and 122-3) are translated into the same physical address area (e.g., the address area 103-16), the area of the memory 62 can be used efficiently. Similar to the data virtual address space 122, in the instruction virtual address space 121, a plurality of virtual addresses in the page unit can be translated into the same physical address area.

Figure 12:
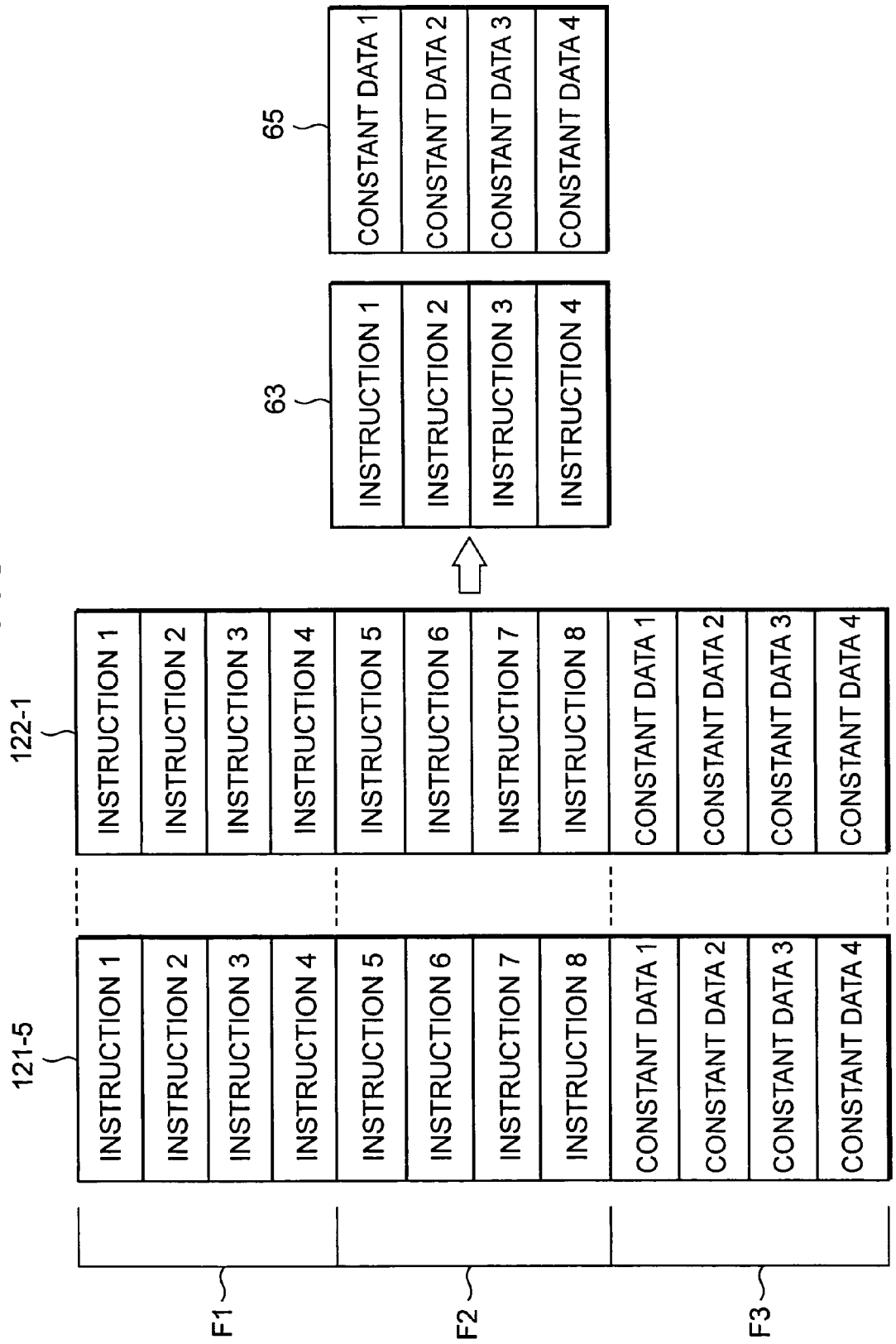
FIG. 12 is a diagram showing an example of the structure of data in the instruction cache and data cache shown in FIG. 5 and applied to the example shown in FIG. 11.

FIG. 12 is a diagram showing an example of the structure of instructions and data in the instruction cache 63 and data cache 65 shown in FIG. 5 using the instruction virtual address space 121 and data virtual address space 122 shown in FIG. 11. In the example shown in FIG. 12, the description will be made by using the address area 121-5 of the instruction virtual address space 121 and the address area 122-1 of the data virtual address space 122, which correspond to the same address area 103-15 of the physical address space 103 shown in FIG. 11.

In the example shown in FIG. 12, the address area 121-5 of the instruction virtual address space 121 includes the virtual addresses corresponding to instructions 1 to 8 and constant data 1 to 4 (the virtual addresses for storing the instructions 1 to 8 and the constant data 1 to 4). A range F1 of the instructions 1 to 4, a range F2 of the instructions 5 to 8 and a range F3 of the constant data 1 to 4 are the range to be registered in the cache. Namely, in the address area 121-5, the virtual addresses for the instructions and constant data are separated in the cache line unit (e.g., 16 bytes and 32 bytes).

Therefore, if the CPU 61 designates the virtual address of the instructional in the address area 121-5, the instructions in the range F1 are registered in the instruction cache 63, and if the CPU 61 designates the virtual address of the instruction 5 in the address area 121-5, the instructions in the range F2 are registered in the instruction cache 63, However, since the virtual address of the constant data in the address area 121-5 of the instruction virtual address space 121 will not be designated, the constant data in the range F3 will not be registered in the instruction cache 63.

Similarly, the address area 122-1 of the data virtual address space 122 includes the virtual addresses corresponding to instructions 1 to 8 and constant data 1 to 4 (the virtual addresses for storing the instructions 1 to 8 and the constant data 1 to 4). The range F1 of the instructions 1 to 4, the range F2 of the instructions 5 to 8 and the range F3 of the constant data 1 to 4 are the range to be registered in the cache. Namely, in the address area 122-1, the virtual addresses for the instructions and constant data are separated in the cache line unit.

Also in this case, if the CPU 61 designates the virtual address of the constant data 1 in the address area 122-1, the data in the range F3 is registered in the data cache 65. However, since the virtual address of data in the address area 122-1 of the data virtual address space 122 will not be designated, the instructions in the range F1 or F2 will not be registered in the data cache 65.

As above, since the instructions and data are disposed in the same page (address translation) unit, the instructions and data are separated in the cache line unit, the wasteful area of the memory 62 can be reduced more than the separation in the page unit as in the example shown in FIG. 10. Furthermore, the data will not be registered in the instruction cache 63 and the instructions will not be registered in the data cache 65, so that the precious memory area can be used efficiently.

In the instruction virtual address space 121 and data virtual address space 122 shown in FIG. 11, the instructions and data in the same page (address translation) unit are separated in the cache line unit in the address area (address translation unit) having the border between the instruction and data in the physical address space 103. In the address areas other than the address area having the border between the instruction and data, the instructions and data are separated like the instruction virtual address space 101 and data virtual address space 102 shown in FIG. 7.

Therefore, similar to the instruction virtual address space 101 and data virtual address space 102 shown in FIG. 7, also in the instruction virtual address space 121 and data virtual address space 122, it is obvious that the data and the instruction using the data can be allocated at the virtual addresses nearer each other than those shown in the virtual address space in FIG. 1 (or at the same virtual address). Even if the data such as a long constant to be used by an instruction is to be stored separately from the instruction, the data is often allocated to the data virtual address space 122. Therefore, it is possible to suppress the number of wasteful instructions from being increased, as compared to the virtual address space shown in FIG. 1.

In the foregoing description, the structure of the memory 62 is not specifically defined. Next, with reference to FIG. 13, the memory 62 including devices will be described. In the following, although the virtual address space having the structure described with reference to FIG. 7 is used, the same structure of the memory can be applied also to the virtual address space having the structure described with reference to FIG. 7, and so the description for the latter is omitted.

Figure 13:
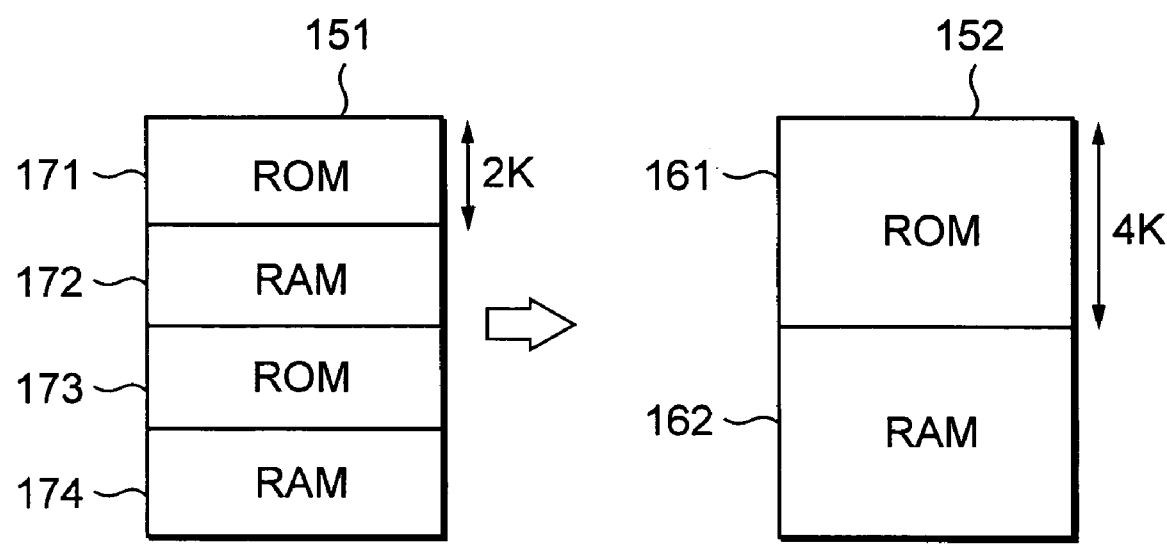
FIG. 13 is a diagram showing another example of the structure of the data virtual address space of the information processing apparatus shown in FIG. 5.

In the example shown in FIG. 13, the memory 62 includes a ROM and a RAM. ROM is a read only semiconductor memory and stores therein the instructions unnecessary to be rewritten and data to be used by the instructions. RAM is made of a semiconductor memory capable of being read and written by designating an arbitrary address, and stores therein data designated by an instruction in ROM or other data. Therefore, although an instruction virtual address space (not shown) includes ROM, a data virtual address space 151 includes ROM and RAM as shown in FIG. 13. In FIG. 13, although ROM is used for a write inhibited area and RAM is used for a write permitted area, the write inhibited area may include RAM which is write-inhibited by the instruction address translation unit 64 or data address translation unit 66.

FIG. 13 is a diagram showing an example of the structures of the data virtual address space 151 and a corresponding physical address space 152. In the example shown in FIG. 13, the physical address space 152 includes: an address area 161 of 4 K bytes for storing ROM data; and an address area 162 of 4 K bytes for storing RAM data.

The data virtual address space 151 includes: an address area 171 of 2 K bytes for storing ROM data; an address area 172 of 2 K bytes for storing RAM data; an address area 173 of 2 K bytes for storing ROM data; and an address area 174 of 2 K bytes for storing RAM data, in this order. In the data virtual address space 151, the data stored in the address area 161 of ROM of 4 K bytes in the physical address space 152 is divisionally stored in the address areas 171 and 173 of 2 K bytes, a half of the capacity of the address area 161, and the data stored in the address area 162 of RAM of 4 K bytes in the physical address space 152 is divisionally stored in the address areas 172 and 174 of 2 K bytes, a half of the capacity of the address area 162.

By structuring the data virtual address space 151 in the above manner, even if data corresponding to an instruction at the start portion of the instruction virtual address space is stored in RAM and even if data corresponding to an instruction at the end portion of the instruction virtual address space is stored in RAM, the virtual address of data corresponding to the instruction can be suppressed from being located at a relatively far distance from the instruction, as compared to that the data virtual address space 151 has the same structure as that of the physical address space 152.

Next, with reference to FIGS. 14 and 15, description will be made on a method of translating a virtual address in the data virtual address space 151 into a physical address in the physical address space 152.

Figure 14:
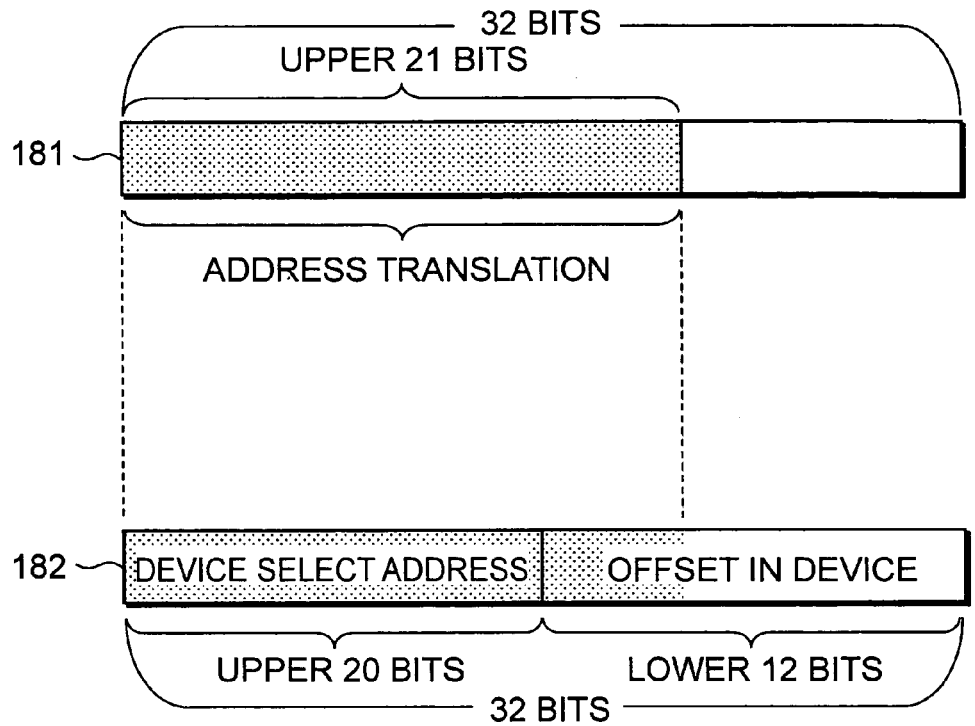
FIG. 14 is a diagram illustrating an example of address translation in the related art.

In the example shown in FIG. 14, the device (ROM and RAM) is different for each address area of 4 K bytes as shown in the physical address space 152 shown in FIG. 13, and a physical address 182 has 32 bits in total: upper 20 bits as a device select address and lower 12 bits as an offset address in device. The device select address is used for selecting a device (e.g., ROM or RAM), and the offset address in device is used for designating the offset position in the device (e.g., in the address area of ROM).

For example, if a virtual address 181 of the RAM address area 172 in the data virtual address space 151 shown in FIG. 13, is translated into the physical address 182 of the address region 162 of the RAM address area 162 in the physical address space 152, it is necessary not only to select the device but also to translate the off set position in the device. Therefore, as shown by hatched areas in FIG. 14, it is necessary to translate not only the upper 20 bits as the device select address but also a portion of the lower bits (in the example of FIG. 14, 1 bit) as the offset address in device.

Figure 15:
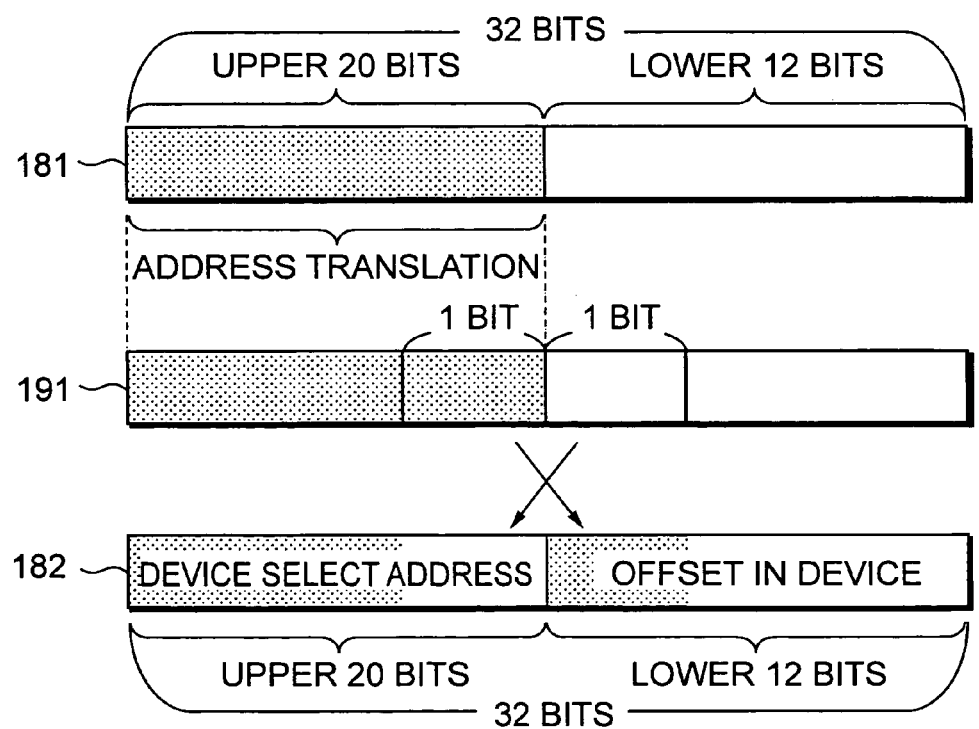
FIG. 15 is a diagram illustrating an example of address translation to be executed by the information processing apparatus shown in FIG. 5.

As shown in FIG. 15, the lower 12 bits of the virtual address 181 in the data virtual address space 151 are not translated but the upper 20 bits (hatched in FIG. 15) of the virtual address 181 are subjected to a predetermined address translation by using the data address translation table to obtain a translated address 191. Thereafter, the lowest 1 bit of the translated upper 20 bits (hatched in FIG. 15) is exchanged with the highest 1 bit of the remaining lower 12 bits to obtain the physical address 182. In this manner, the physical address 182 can be obtained with not only the device select address but also the offset address in device being translated, without directly translating the lower bits as the offset address in device by using the data address translation table.

The address translation method shown in FIG. 15 use the number of bits smaller than that of the address translation method shown in FIG. 14, so that the address translation can be performed more efficiently. The data address translation table used by the method shown in FIG. 15 is assumed to be formed by considering the exchange between the upper 1 bit and lower 1 bit after translation. The number of upper bits, the number of lower bits, the total number of address bits, and the predetermined number of upper and lower bits to be exchanged after translation, are not limited only to those described above. For example, the predetermined number of upper and lower bits to be exchanged after translation may be 2 bits or 10 bits.

Figure 16:
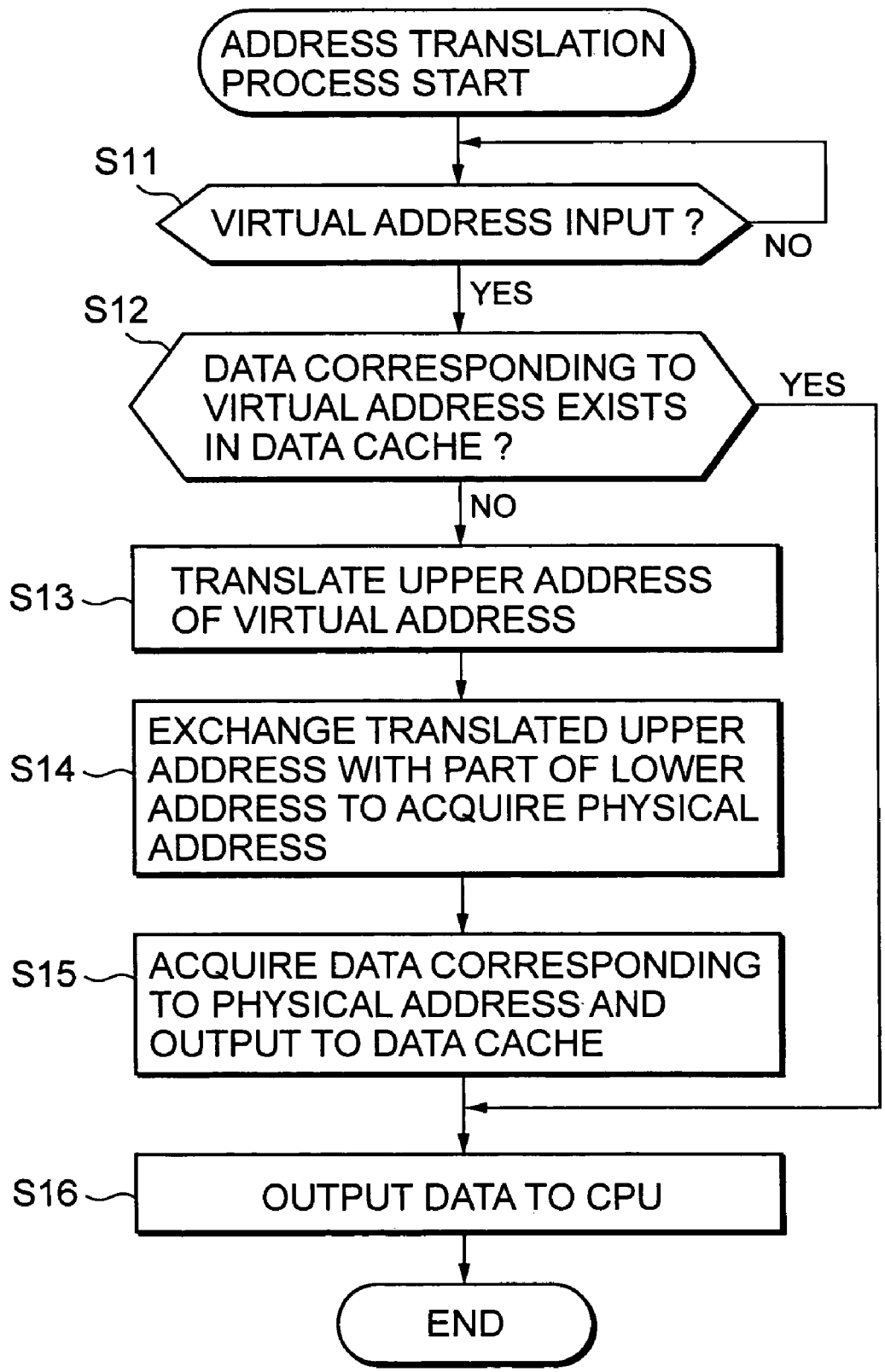
FIG. 16 is a flow chart illustrating an address translation processing to be executed by the information processing apparatus shown in FIG. 5.

Next, with reference to the flow chart shown in FIG. 16, the address translation processing described with reference to FIG. 15 will be described.

In order to acquire data from the memory 62, the CPU 61 refers to the data virtual address space 151 and outputs the virtual address (e.g., the virtual address 181 shown in FIG. 15) corresponding to the data to the data cache 65 and data address translation unit 66 via the data bus 72.

At Step S11 the data cache 65 stands by until the virtual address is input from the CPU 61. If it is judged that the virtual address was input from the CPU 61, the flow advances to Step S12 whereat it is judged whether the data corresponding to the virtual address input from the CPU 61 exists in the data cache 65.

If it is judged at Step S12 that the data corresponding to the virtual address input from the CPU 61 does not exist in the data cache 65, the data cache 65 outputs this result to the data address translation unit 66 to follow Step S13 whereat the data address translation unit 66 translates the upper address 20 bits of the virtual address by referring to a predetermined data address translation table to follow Step S14. In this case, as understood from the translated address 191 shown in FIG. 15, the remaining lower 12 bits of the virtual address remain as they are and are not translated.

At Step S14 the data address translation unit 66 exchanges a portion (1 bit, in the example shown in FIG. 15) of the translated address of the upper 20 bits with a portion (1 bit, in the example shown in FIG. 15) of the address of the remaining lower 12 bits to acquire the physical address (physical address 182, in the example shown in FIG. 15). The acquired physical address is output to the bus controller 67 to follow Step S15.

At Step S15 the bus controller 67 acquires the data corresponding to the physical address supplied from the data address translation unit 66, from the memory 62, and outputs it to the data cache 65 to follow Step S16 whereat the data cache 65 outputs the data supplied from the bus controller 67 to the CPU 61 via the data bus 72.

If it is judged at Step S12 that the data corresponding to the virtual address input from the CPU 61 exists in the data cache 65, the processing at Steps S13 to S15 are skipped to advance to Step S16 whereat the data corresponding to the virtual address input from the CPU 61 is output to the CPU 61 via the data bus 72.

As above, only the upper address of the virtual address in the data virtual address space 151 designated by the CPU 61 is translated and a portion of the translated upper address is exchanged with a portion of the remaining lower address. In this manner, translation into the physical address in the physical address space becomes possible. The number of bits to be translated can therefore be reduced more than the translation of the whole virtual address. A translation efficiency can therefore be improved.

Figure 17:
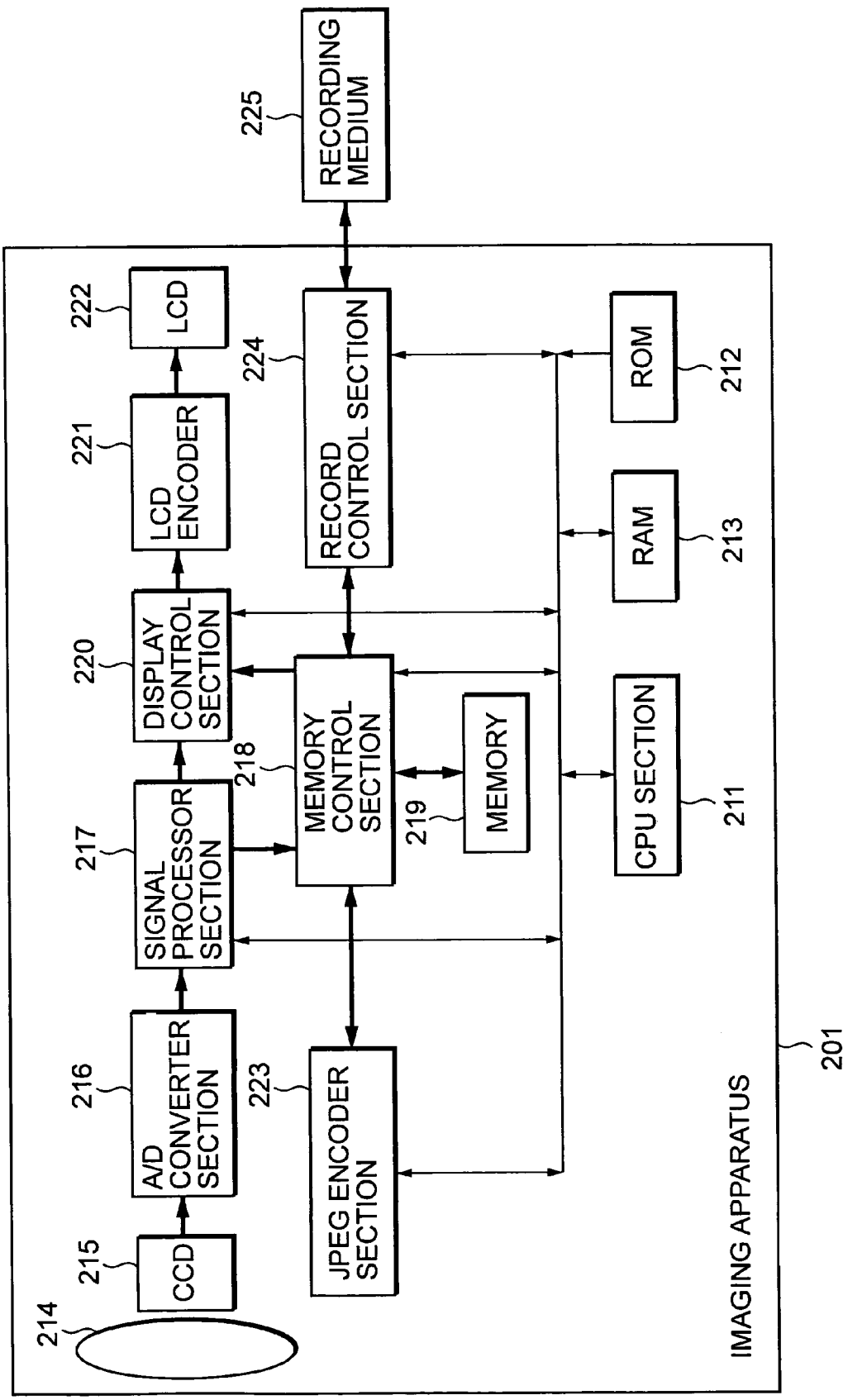
FIG. 17 is a block diagram showing an example of the structure of an imaging apparatus according to an embodiment of the present invention.

FIG. 17 is a diagram showing an example of the structure of an imaging apparatus 201 according to an embodiment of the present invention. The imaging apparatus 201 maybe a camcoder (a video recorder with a built-in camera), a digital still camera (DSC) or the like. Referring to FIG. 17, a CPU unit 211 executes various arithmetic calculation processing in accordance with an instruction or a program stored in a read only memory (ROM) 212 or a random access memory (RAM) 213.

A lens 214 receives light from an object and focuses the light on a charge-coupled device (CCD) imaging unit 215 (hereinafter simply called a CCD 215). CCD 215 outputs image data of an object image to an analog/digital (A/D) converter unit 216. The A/D converter unit 216 converts the image data supplied from CCD 215 into digital data, and outputs it to a signal processor unit 217. The signal processor unit 217 processes the digital image data converted by the A/D converter unit 216 and stores the processed image data in a memory 219 via the memory control unit 218.

A display control unit 220 reads the image data stored in the memory 219 via the memory control unit 218, and controls a liquid crystal display (LCD) encoder 221 to encode the image data read from the memory 219 in the format suitable for an LCD 222 to display the image on LCD 222.

A Joint Photographic Experts Group (JPEG) encoder unit 223 reads the image data stored in the memory 219 via the memory control unit 218, JPEG-encodes it and writes back it in the memory 219 via the memory control unit 218. A record control unit 224 reads the image data encoded by the JPEG encoder unit 223 from the memory 219 via the memory control unit 218, and records it in a storage medium 225 such as an optical disk and a memory stick (trademark).

Although not shown in FIG. 17, the signal processor unit 217, memory control unit 218, display control unit 220, JPEG encoder unit 223 and record control unit 224 each have an input/output (I/O) register to be controlled by the CPU unit 211. The CPU unit 211 reads/writes data from/into the I/O register built in each of the signal processor unit 217, memory control unit 218, display control unit 220, JPEG encoder unit 223 and record control unit 224, to thereby control these units.

Figure 18:
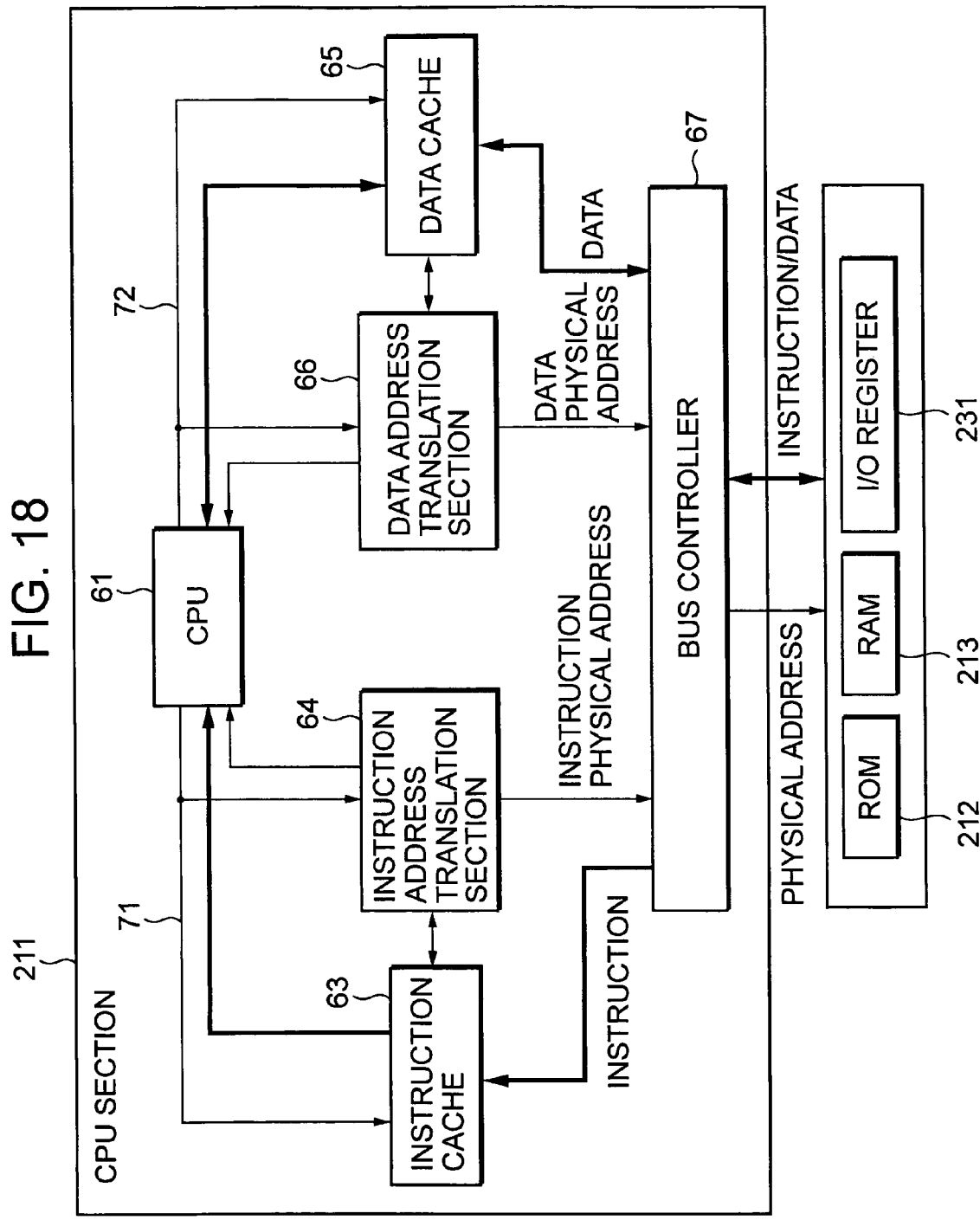
FIG. 18 is a block diagram showing an example of the structure of a CPU unit shown in FIG. 17.

FIG. 18 is a diagram showing an example of the structure of the CPU unit 211 shown in FIG. 17. In FIG. 18, elements corresponding to those shown in FIG. 5 are represented by corresponding reference numerals and characters, and the description thereof is omitted where appropriate in order to avoid duplicated descriptions.

A CPU 61 acquires an instruction and data stored in a ROM 212 and an I/O register 231 and executes various arithmetic calculation processing in accordance with the instruction and data. The CPU 61 reads/writes data from/into a RAM 213 and I/O register 231. The I/O register 231 includes I/O registers built in the signal processor unit 217, memory control unit 218, display control unit 220, JPEG encoder unit 223 and record control unit 224, respectively controlled by the CPU 61.

An instruction address translation unit 64 and a data address translation unit 66 control the read/write access right of RAM 213 and I/O register 231. If a write instruction or the like is input from the CPU 61 and if the corresponding virtual address indicates a write inhibited (read only) area, the instruction address translation unit 64 and data address translation unit 66 notify an exception signal or the like to the CPU 61.

The CPU unit 211 shown in FIG. 18 has separately an instruction bus 71 for transferring an instruction from the CPU 61 and a data bus 72 for transferring data (constants, variables, register addresses) from the CPU 61. As will be later described with reference to FIG. 19, the CPU unit 211 has a physical address space 251 including physical addresses of ROM 212, RAM 213 and I/O register 231, as well as independent virtual address spaces: an instruction virtual address space 252 for the instruction bus 71 and a data virtual address space 253 for the data bus 72.

If the CPU 61 acquires an instruction from ROM 212, it looks at ROM 212 through the instruction virtual address space 252 and designates the virtual address corresponding to the instruction. The CPU 61 outputs the designated virtual address to an instruction cache 63 and instruction address translation unit 64 via the instruction bus 71. If the CPU 61 acquires data from ROM 212, RAM 213 or I/O register 231, it looks at ROM 212, RAM 213 or I/O register 231 through the data virtual address space 253 and designates the virtual address corresponding to the data. The CPU 61 outputs the designated virtual address to a data cache 65 and data address translation unit 66 via the data bus 72.

A bus controller 67 acquires the instruction corresponding to a physical address supplied from the instruction address translation unit 64, from ROM 212, and outputs it to the CPU 61 via the instruction cache 63 and instruction bus 71. The bus controller 67 acquires the data corresponding to a physical address supplied from the data address translation unit 66, from ROM 212, RAM 213 or I/O register 231, and outputs it to the CPU 61 via the data cache 65 and data bus 72.

FIG. 19 is a diagram showing an example of the structure of the physical address space 251, instruction virtual address space 252 and data virtual address space 253, respectively of the imaging apparatus 201. In the instruction virtual address space 252 and data virtual address space 253 shown in FIG. 19, it is assumed that the areas on the same row as counted from the top row use the same virtual address.

In the imaging apparatus 201, although the hardware interconnection is used like the physical address space 251, the CPU 61 can look the physical address space as if it is the virtual address map structure like the instruction virtual address space 252 and data virtual address space 253.

The physical address space 251 includes: an address area 251-1 for storing instructions of ROM 212; an address area 251-2 for storing data of ROM 212; an address area 251-3 for storing data of RAM 213; an address area 251-4 for storing data in the I/O register of the signal processor unit 217; an address area 251-5 for storing data in the I/O register of the memory control unit 218; an address area 251-6 for storing data of the I/O register of the JPEG encoder unit 223; an address area 251-7 for storing data of the I/O register of the display control unit 220; and an address area 251-8 for storing data of the I/O register of the record control unit 224.

The instruction virtual address space 252 includes an address area 252-1 for storing instructions of ROM 212.

The data virtual address space 253 includes: an address area 253-1 for storing data of ROM 212; an address area 253-2 for storing data of RAM 213; an address area 253-3 for storing data of the I/O register of the signal processing unit 217; an address area 253-4 for storing data of ROM 212; an address area 253-5 for storing data of RAM 213; an address area 253-6 for storing data of the I/O register of the memory control unit 218; an address area 253-7 for storing data of ROM 212; an address area 253-8 for storing data of RAM 213; an address area 253-9 for storing data of the I/O register of the JPEG encoder unit 223; an address area 253-10 for storing data of ROM 212; an address area 253-11 for storing data of RAM 213; an address area 253-12 for storing data of the I/O register of the display control unit 220; an address area 253-13 for storing data of ROM 212; an address area 253-14 for storing data of RAM 213; an address area 253-15 for storing data of the I/O register of the record control unit 224.

Namely, the instructions of ROM 212 stored in the address area 251-1 on the physical address space 251 are stored in the address area 252-1 in the instruction virtual address space 252. The data of ROM 212 stored in the address area 251-2 of the physical address space 251 is divisionally stored in the address area 253-1, address area 253-4, address area 253-7, address area 253-10 and address area 253-13, respectively of the data virtual address space 253. The data of RAM 213 stored in the address area 251-3 of the physical address space 251 is divisionally stored in the address area 253-2, address area 253-5, address area 253-8, address area 253-11 and address area 153-14, respectively of the data virtual address space 253.

The data of the I/O register of the signal processor unit 217 stored in the address area 251-4 of the physical address space 251 is stored in the address area 253-3 of the data virtual address space 253. The data of the I/O register of the memory control unit 218 stored in the address area 251-5 of the physical address space 251 is stored in the address area 253-6 of the data virtual address space 253. The data of the I/O register of the JPEG encoder unit 223 stored in the address area 251-6 of the physical address space 251 is stored in the address area 253-9 of the data virtual address space 253. The data of the I/O register of the display control unit 220 stored in the address area 251-7 of the physical address space 251 is stored in the address area 253-12 of the data virtual address space 253. The data of the I/O register of the record control unit 224 stored in the address area 251-8 of the physical address space 251 is stored in the address area 253-15 of the data virtual address space 253.

As above, in the imaging apparatus 201 shown in FIG. 18, the instruction virtual address space 252 is structured so that only the virtual addresses of instructions are disposed (stored), and the data virtual address space 253 is structured so that only the virtual addresses of data such as constants, variables and register addresses are disposed (stored) These instruction virtual address space 252 and data virtual address space 253 are made independent having duplicated addresses. Therefore, as described earlier with reference to FIGS. 7 to 9, the distance is not long between the virtual addresses of an instruction and corresponding data. It is not necessary to dispose data such as constant and use an instruction such as a jump instruction, thereby suppressing an increase in the number of wasteful instructions.

In the data virtual address space 252, the I/O register group (I/O registers of the signal processor unit 217, memory control unit 218, display control unit 220, JPEG encoder unit 223 and record control unit 224) is divided and disposed in a plurality of address areas. It is therefore possible to suppress that the virtual addresses of an instruction and corresponding data are disposed at a long distance, and the chances become quite frequent that the virtual address for the data to be designated by the instruction can be set to the virtual address at the distance from the virtual address for the instruction where the operand of the instruction can designate.

The data of ROM 212 stored in the address area 251-2 of the physical address space 251 is divisionally stored at the virtual addresses of the address area 253-1, address area 253-4, address area 253-7, address area 253-10 and address area 253-13 of the data virtual address space 253, and the data of RAM 213 stored in the address area 2531-3 of the physical address space 251 is divisionally stored at the virtual addresses of the address area 253-2, address area 253-5, address area 253-8, address area 253-11 and address area 253-14. It is therefore possible to suppress that the virtual addresses of an instruction and corresponding data are disposed at a long distance, and the chances become quite frequent that the virtual address for the data to be designated by the instruction can be set to the virtual address at the distance from the virtual address for the instruction where the operand of the instruction can designate.

In the foregoing description, although the physical address space 251, instruction virtual address space 252 and data virtual address space 253 shown in FIG. 19 are structured based upon the structure of the virtual address spaces described with reference to FIG. 7, they may be structured based upon the structure of the virtual address spaces shown in FIG. 11. In this case, in addition to the above-described effects, the wasteful area in the memories such as ROM 212, RAM 213 and I/O registers can be reduced since a plurality of virtual addresses can be translated in the same page (address translation) unit of the physical address space.

In the example shown in FIG. 19, data of ROM 212 and RAM 213 is divisionally stored at the virtual addresses of a plurality of address areas of the data virtual address space 253. Similarly, the data (data of the same register) of each of the I/O registers of the signal processor unit 217, memory control unit 218, display control unit 220, JPEG encoder unit 223 and record control unit 224 may also be registered at the virtual addresses of a plurality of address areas of the data virtual address space 253.

Next, with reference to the flow charts shown in FIGS. 20 and 21, description will be made on an address translation processing from the data virtual address space 253 to physical address space 251 disposed in the manner described above. The similar processing to that shown in FIG. 16 is performed in the processing shown in FIG. 21, and so the detailed description thereof is omitted where appropriate in order to avoid duplicated descriptions.

Figure 20:
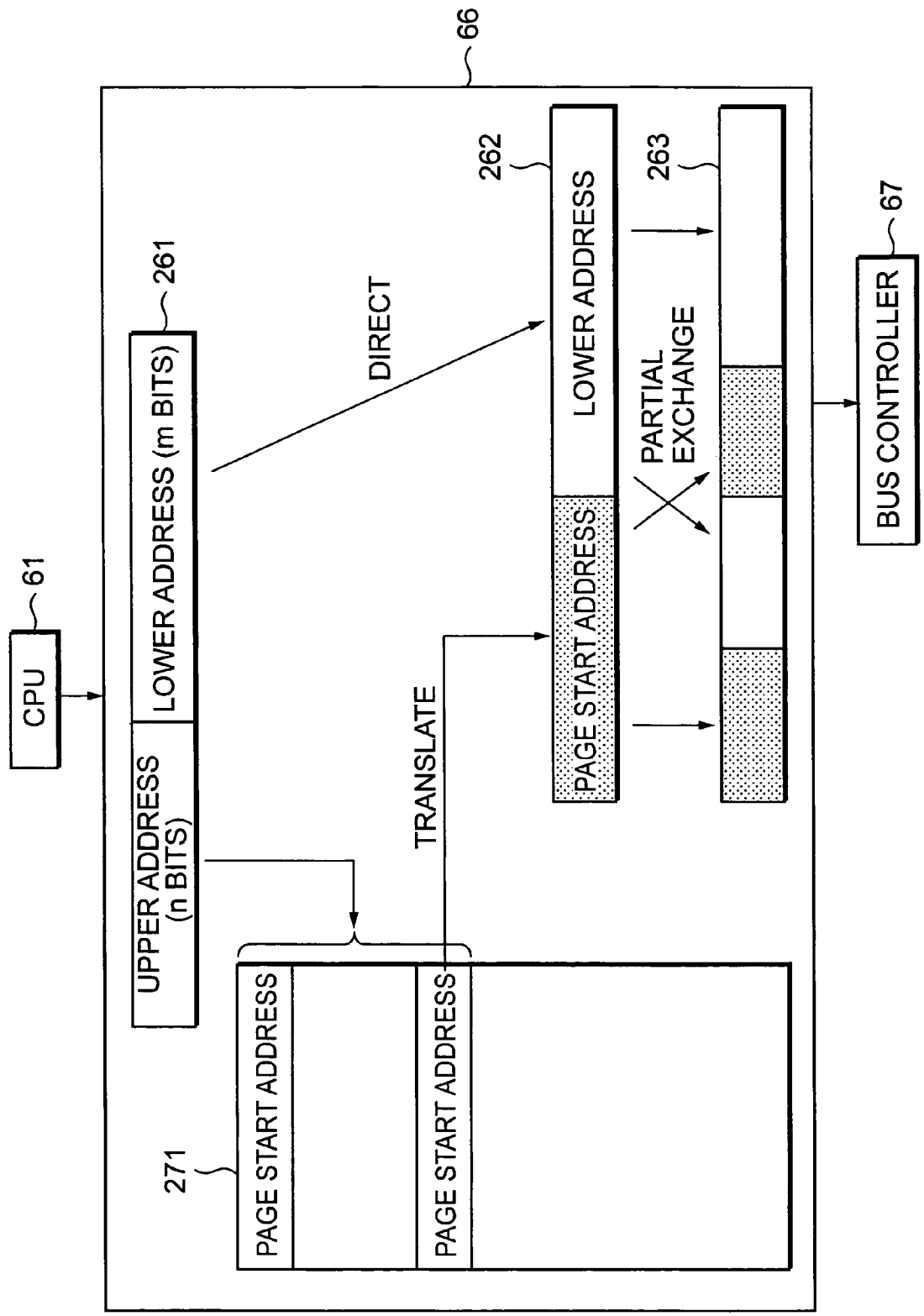
FIG. 20 is a diagram illustrating an example of address translation to be executed by the imaging apparatus shown in FIG. 17.

FIG. 20 illustrates an example of address translation to be executed in the data address translation unit 66. In order to acquire data from ROM 212, RAM 213 or I/O register 231 or write data in ROM 212, RAM 213 or I/O register 231, the CPU 61 refers to the data virtual address space 253 and outputs the virtual address 261 (n+m bits) corresponding to the data to the data cache 65 and data address translation unit 66 via the data bus 72.

In the example shown in FIG. 20, the virtual address includes an upper address of n bits and a lower address of m bits. The upper address indicates the start address of a page which is the address translation minimum unit, and the lower address indicates the offset address in the page.

Figure 21:
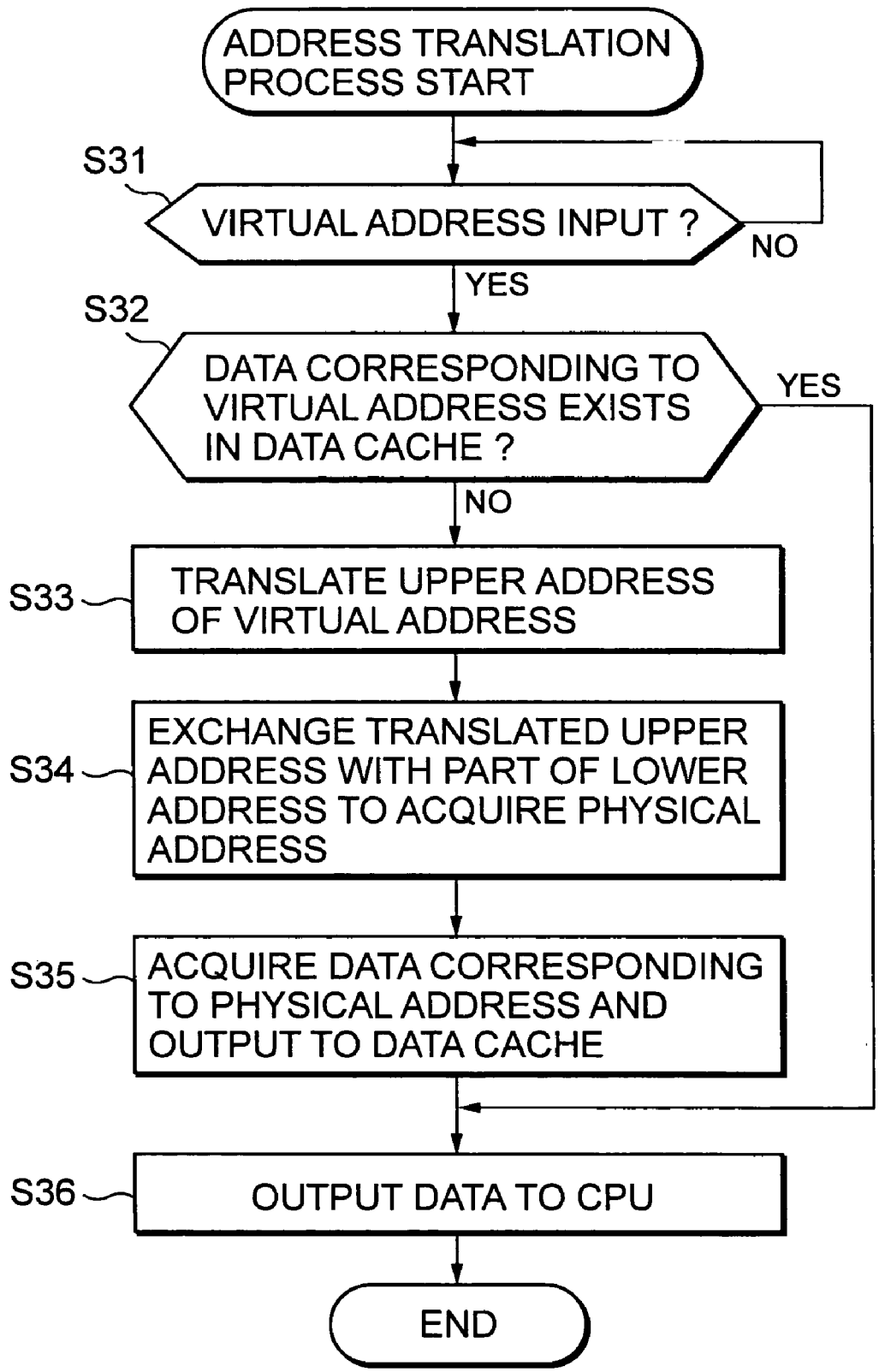
FIG. 21 is a flow chart illustrating an address translation processing to be executed by the imaging apparatus shown in FIG. 17.

At Step S31 shown in FIG. 21, the data cache 65 stands by until the virtual address is input from the CPU 61. If it is judged that the virtual address was input from the CPU 61, the flow advances to Step S32 whereat it is judged whether the data corresponding to the virtual address input from the CPU 61 exists in the data cache 65.

If it is judged at Step S32 that the data corresponding to the virtual address input from the CPU 61 does not exist in the data cache 65, the flow advances to Step S33 whereat the data address translation unit 66 translates the upper address of n bits of the virtual address 261 by referring to the data address translation table 271 to follow Step S34.

In the example shown in FIG. 20, the upper address of n bits of the virtual address 261 of (n+m) bits indicates the start address of the page which is the address translation minimum unit. The data address translation unit 66 has a translation table 271 which is used if the upper address representative of the page start address is translated into a predetermined page start address among a plurality of page start addresses of the physical addresses. The data address translation unit 66 refers to this data address translation table 271 and acquires the page start address corresponding to the upper address n bits to translate the upper address n bits into the corresponding page start address. Since the remaining lower address m bits are not translated, a translated address 262 includes the translated page start address (hatched in FIG. 20) and the original lower address.

At Step S34 shown in FIG. 21, the data address translation unit 66 exchanges a portion (e.g., 3 bits) of the translated page start address of n bits with a portion of the remaining lower address of m bits, respectively in the translated address 262. In this manner, a physical address shown in FIG. 20 is acquired. The physical address 263 includes: (n−3) bits of the page start address; 3 bits of the lower address; 3 bits of the page start address; and (m−3) bits of the lower address, in this order from the left (upper bit side). The data address translation unit 66 outputs the acquired physical address 263 to the bus controller 67 to follow Step S35 shown in FIG. 21.

At Step S35, the bus controller 67 acquires the data corresponding to the physical address 263 supplied from the data address translation unit 66, from ROM 212, RAM 213 or I/O register 231, and outputs it to the data cache 65 to follow Step S36. At Step S36, the data cache 65 outputs the data supplied from the bus controller 67 to the CPU 61 via the data bus 72.

If it is judged at Step S32 that the data corresponding to the virtual address input from the CPU 61 exists in the data cache 65, the processing at Steps S33 to S35 are skipped to advance to Step S36 whereat the data corresponding to the virtual address input from the CPU 61 is output to the CPU 61 via the data bus 72.

As above, only the upper address of the page start address of the virtual address 261 in the data virtual address space 253 designated by the CPU 61 is translated and a portion of the translated upper address is exchanged with a portion of the remaining lower address. In this manner, translation into the physical address 263 in the physical address space 251 becomes possible. It is possible to translate into the physical address without translating the lower address of the data virtual address. The number of bits to be translated can therefore be reduced, and a translation efficiency can be improved.

Figure 22:
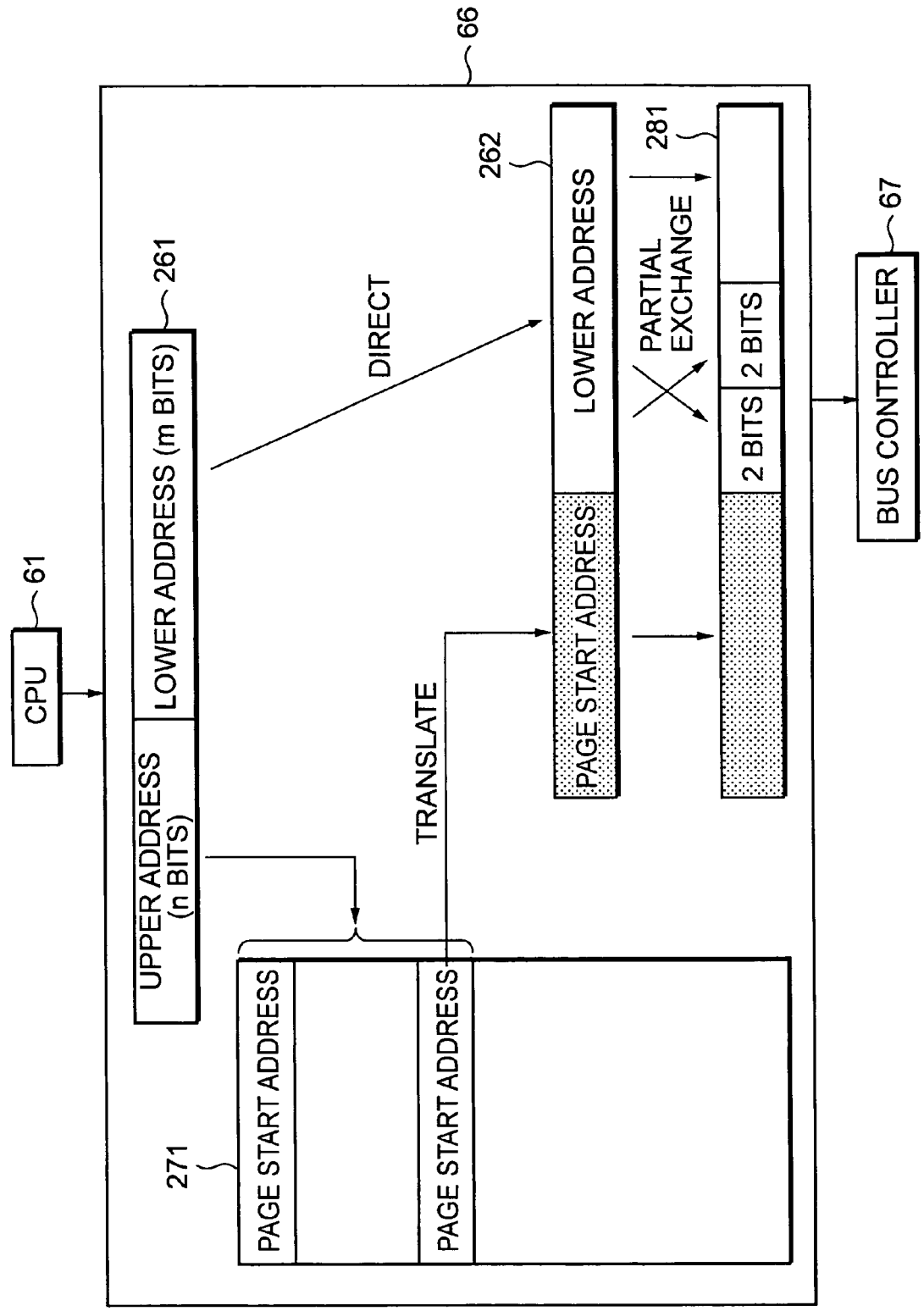
FIG. 22 is a diagram showing another example of address translation to be executed by the imaging apparatus shown in FIG. 17.

In the foregoing description, in the translated address 262 shown in FIG. 20, a portion of the translated upper address is exchanged with a portion of the remaining lower address. A physical address 281 may be acquired by the processing illustrated in FIG. 22. In the example shown in FIG. 22, in the translated address 262, the page start address (upper address) translated by referring to the data address translation table 271 is not changed, and portions of the remaining lower address (m bits) (e.g., the upper 2 bits and next 2 bits of the lower address) are exchanged to acquire the physical address 281. In this case, the physical address includes: n bits of the page start address, exchanged 4 bits (2 bits+2 bits); and (m−4) bits of the lower address, in this order from the left (upper bit side).

Figure 23:
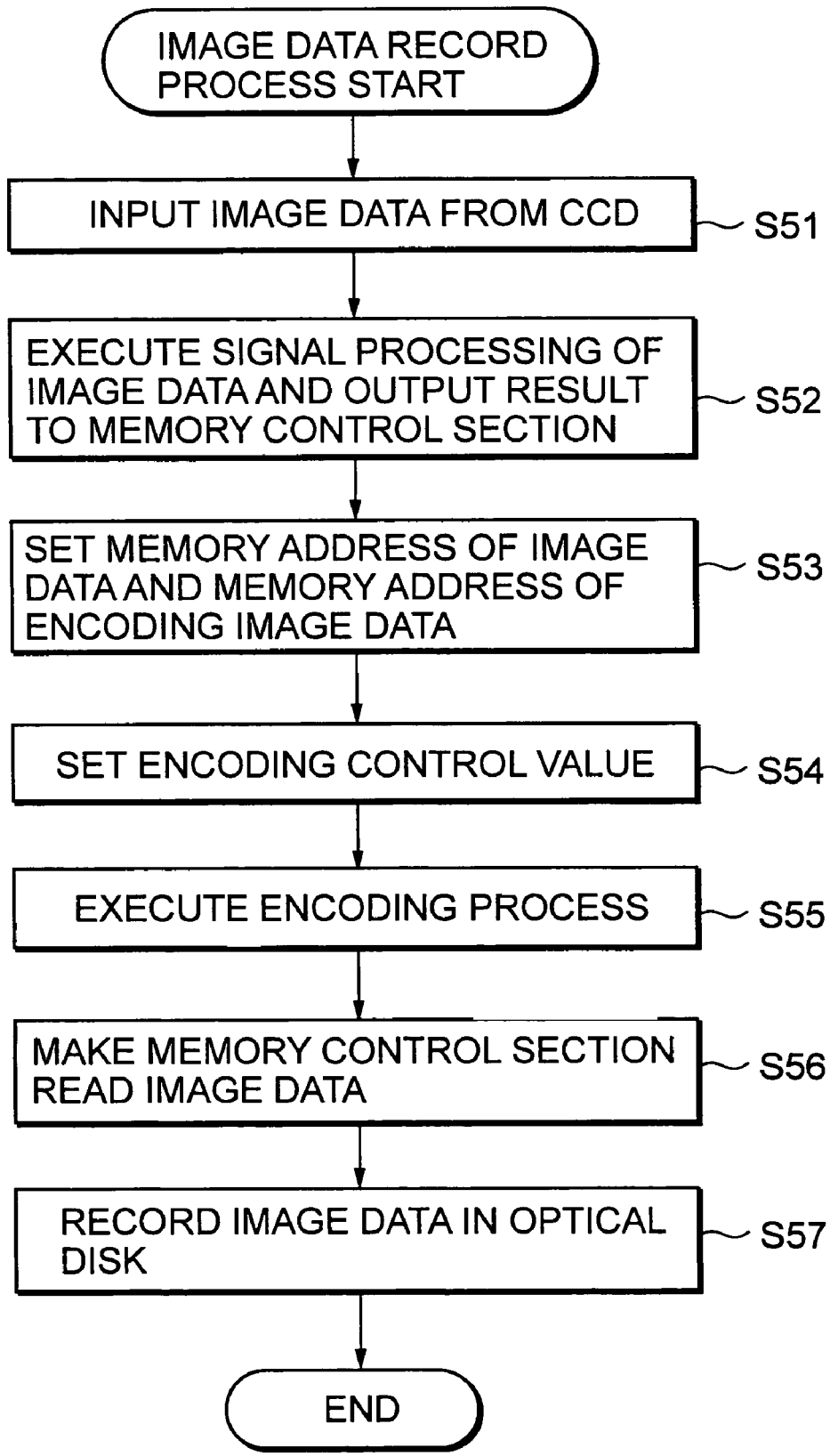
FIG. 23 is a flow chart illustrating an image data recording processing to be executed by the imaging apparatus shown in FIG. 17.

Next, with reference to the flow chart of FIG. 23, description will be made on an image data recording processing of the imaging apparatus 201.

The lens 214 receives light from an object and focuses it on CCD 215. CCD 215 outputs image data of the object image to the A/D converter unit 216. In correspondence with this, at Step S51 the signal processor unit 217 receives the image data supplied from CCD 215 via the A/D converter 216 to follow Step S52 whereat the image data supplied from CCD 215 is subjected to predetermined signal processing and the processed image signal is output to the memory control unit 218. The memory control unit 218 stores the image data supplied from the signal processor unit 217 in the memory 219 to follow Step S53.

At Step S53 the JPEG encoder unit 223 sets an address of the image data in the memory 219 and sets an address of encoded image data in the memory 219 for storing encoded image data to follow Step S54 whereat an encoding control value is set to thereafter follow Step S55.

In accordance with the addresses of the image data and encoded image data in the memory 219 and the encoding control value set at Steps S53 and 54, the JPEG encoder unit 223 encodes the image data at Step S55. The JPEG encoder unit 223 controls the memory control unit 218 to store the encoded image data in the memory 219 to follow Step S56.

At Step S56 the JPEG encoder unit 223 controls the memory control unit 218 to read encoded image data from the memory 218 to follow Step S57 where at the encoded image data read from the memory 219 is recorded in the storage medium 225.

The image data taken with the imaging apparatus 201 is recorded in the storage medium in the manner described above. The processing at all Steps shown in FIG. 23 are executed under the control by the CPU61 of ROM 212, RAM 213 and the I/O register built in each of the signal processor unit 217, memory control unit 218, display control unit 220, JPEG encoder unit 223, and record control unit 224.

Namely, the virtual address designated by the CPU 61 is translated into the physical address as described with reference to the flow charts of FIGS. 20 and 21, and the physical address is output to ROM 212, RAM 213 and the I/O register built in each of the signal processor unit 217, memory control unit 218, display control unit 220, JPEG encoder unit 223, and record control unit 224. The processing of each Step is executed by ROM 212, RAM 213 and the I/O register built in each of the signal processor unit 217, memory control unit 218, display control unit 220, JPEG encoder unit 223, or record control unit 224, respectively corresponding to the virtual address designated by the CPU 61.

With reference to FIG. 24 and the flow chart shown in FIG. 25, description will be made on an encoding start command processing of the CPU 61 corresponding to the encoding processing at Step S55 shown in FIG. 23. In FIG. 24, the I/O register of the JPEG encoder unit 223 includes a JPEG start-up register to be used by the CPU 61 to instruct start-up of the JPEG encoder unit 223 and a JPEG status register to be used by the CPU 61 to confirm the status of the JPEG encoder unit 223.

In the example shown in FIG. 24, the instruction virtual address space includes: a virtual address for storing a command "LOAD R0, jpegstart" of executing an operation of "reading a constant "0x00000100" to be written in the JPEG start-up register"; a virtual address for storing a command "STORE R0, jpegcodecreg" of executing an operation of "writing a constant "0x00000100" in the JPEG start-up register"; and a virtual address for storing a command "LOAD R0, jpegstatusreg" of executing an operation of "reading (confirming an end) the JPEG status register jpegstatusreg".

The data virtual address space includes: a virtual address having a label "jpegstart" and the contents "data to be written in the JPEG start-up register" for storing "0x00000100"; a virtual address having a label "jpegcodecreg" and the contents "JPEG start-up register" for storing "a value output from the JPEG encoder unit 223"; and a virtual address having a label "jpegstatusreg" and the contents "JPEG status register" for storing "a value output from the JPEG encoder unit 223".

Strictly speaking, if the CPU 61 designates a virtual address, the instruction or data corresponding to the designated virtual address is output to the CPU 61 if the instruction or data is in the instruction cache 63 or data cache 65. If the instruction or data is not in the instruction cache 63 or data cache 65, the instruction address translation unit 64 or data address translation unit 66 translates the virtual address into the physical address, and then the bus controller 67 reads the instruction or data from ROM 212, RAM 213, or I/O register 231 and outputs it to the CPU 61. However, for the description conveniences, in this specification, description will be made such as, "if the CPU 61 designates a virtual address, the instruction or data corresponding to the virtual address is read and the instruction is executed".

Figure 25:
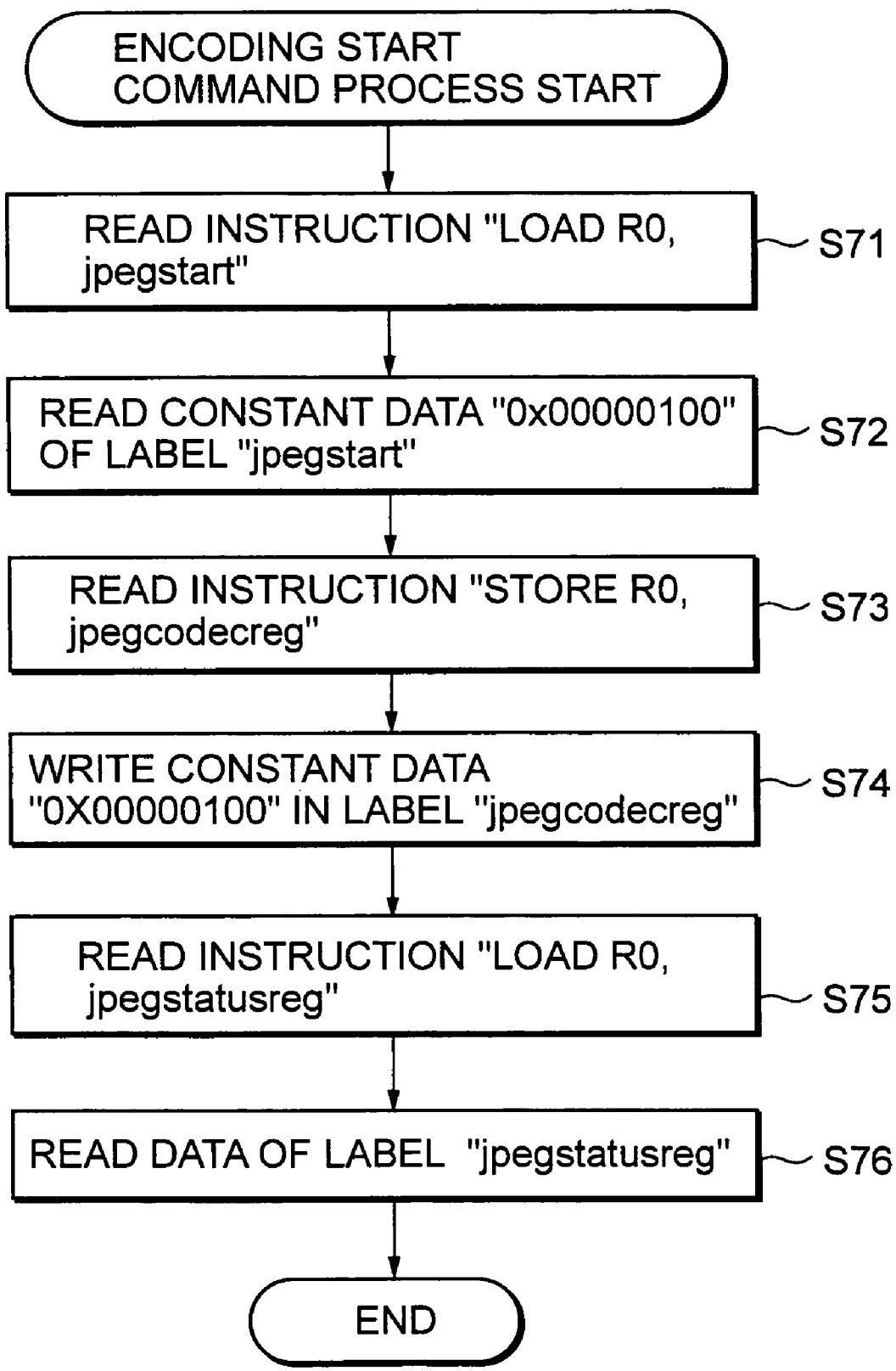
FIG. 25 is a flow chart illustrating an encoding start command processing by the CPU unit controlling Step S55 shown in FIG. 23.

At Step S71 shown in FIG. 25, the CPU 61 reads the command "LOAD R0, jpegstart" in the instruction virtual address space to follow Step S72 whereat in accordance with the command "LOAD R0, jpegstart", the CPU 61 reads the constant "0x00000100" at the virtual address having the label "jpegstart" in the data virtual address space to follow Step S73.

At Step S73 the CPU 61 reads the command "STORE R0, jpegcodecreg" in the instruction virtual address space to follow Step S74 whereat in accordance with the command "STORE R0, jpegcodecreg", the CPU 61 writes the constant data "0x00000100" at the virtual address having the label "jpegcodecreg" in the data virtual address space to follow Step S75. The JPEG encoder unit 223 therefore starts the encoding processing at Step S55 shown in FIG. 23. The JPEG encoder unit 223 outputs a value representative of the start of the encoding processing at the virtual address having the label "jpegstatusreg" corresponding to the JPEG status register.

At Step S75 the CPU 61 reads the command "LOAD R0, jpegstatusreg" in the instruction virtual address space to follow Step S76 whereat in accordance with the command "LOAD R0, jpegstatusreg", the CPU 61 reads the value output from the JPEG encoder unit 223 as the end confirmation stored in the JPEG status register of the JPEG encoder unit 223 having the label "jpegstatusreg" in the data virtual address space, to thereafter terminate the processing.

For the comparison sake, with reference to FIG. 26 and the flow chart shown in FIG. 27, description will be made on an encoding start command processing in the related art, which corresponds to the encoding processing to be executed at Step S55 shown in FIG. 23.

In the example shown in FIG. 26, the instruction virtual address space includes: a virtual address for storing a command "LOAD R0, jpegcodec" of executing an operation of "reading address data jpegcodecreg of the JPEG start-up register"; a virtual address for storing a command "LOAD R1, jpegstart" of executing an operation of "reading a constant "0x00000100" to be written in the JPEG start-up register"; a virtual address for storing a command "STORE R1, [R0]" of executing an operation of "writing the constant "0x00000100" in the JPEG start-up register jpegcodecreg" and a command "JMP" of executing an operation of "unconditionally branch to the address "next" "LOAD R0, jpegstatus"; a virtual address having the label "jpegcodec" for storing the JPEG start-up register address data "jpegcodecreg"; a virtual address having the label "jpegstart" for storing the data "0x00000100" to be written in the JPEG start-up register; a virtual address having the label "jpegstatus" for storing the JPEG status register address data "jpegstatusreg"; a virtual address having the label "next" for storing a command "LOAD R0, jpegstatus" of executing an operation of "reading the address data jpegstatusreg of the JPEG status register"; a virtual address for storing a command "LOAD R1, [R0]" of executing an operation of "reading (confirming an end) of the JPEG status register jpegstatusreg"; , , , a virtual address having the label "jpegcodecreg" and the contents "JPEG start-up register" for storing "a value output from the JPEG encoder unit 223"; and a virtual address having the label "jpegstatusreg" and the contents "JPEG status register" for storing "a value output from the JPEG encoder unit 223".

In a virtual address space in the related art, the virtual addresses for instructions and data are mixed. Since the virtual addresses of the JPEG start-up register and JPEG status register of the JPEG encoder unit 223 are disposed at a long distance, each command cannot directly designate the virtual addresses of the JPEG start-up register and JPEG status register. The number of instructions in an instruction virtual address space in the related art is larger by 3 than that of the instruction virtual address space shown in FIG. 24. The number of instructions in a data virtual address space in the related art is larger by 2 than that of the data virtual address space shown in FIG. 24.

Description will be made on the encoding start command processing in the related art shown in FIG. 26. At Step S81 shown in FIG. 27, the CPU 61 reads the command "LOAD R0, jpegcodec" in the instruction virtual address space to follow Step S82 whereat in accordance with the command "LOAD R0, jpegcodec", the CPU 61 reads the JPEG start-up register address "jpegcodecreg" at the label "jpegcodec" in the virtual address space to follow Step S83.

At Step S83 the CPU 61 reads the command "LOAD R1, jpegstart" in the virtual address space to follow Step S84 whereat in accordance with the command "LOAD R1, jpegstart", the CPU 61 reads the data "0x00000100" to be written in the JPEG start-up register to follow Step S85.

At Step S85 the CPU 61 reads the command "STORE R1, [R0]" in the virtual address space to follow Step S86 whereat in accordance with the command "STORE R1, [R0]", the CPU 61 writes the constant data "0x00000100" in the JPEG start-up register at the label "jpegcodecreg" in the virtual address space to follow Step S87. In this manner, the JPEG encoder unit 223 starts the encoding processing at Step S55 shown in FIG. 23. At this time, the JPEG encoder unit 223 outputs a value representative of the start of the encoding processing to the virtual address having the label "jpegstatusreg" corresponding to the JPEG status register.

At Step S87, the CPU reads the command "JUMP Next" in the virtual address space to follow Step S88 whereat in accordance with the command "JUMP next", the CPU 61 unconditionally branches to the label "next" to read the command "LOAD R0, jpegstatus" to follow Step S89 whereat in accordance with the command "LOAD R0, jpegstatus", the CPU 61 reads the JPEG status register address data "jpegstatusreg" to follow Step S90.

At Step S90 the CPU 61 reads the command "LOAD R1, [R0]" in the virtual address space to follow Step S91 whereat in accordance with the command "LOAD R1, [R0]", the CPU 61 reads the value output from the JPEG encoder unit 223 and written in the JPEG status register "jpegstatusreg" as the end confirmation, to thereafter terminate the processing.

As above, since the virtual address spaces are separated into the data virtual address space and instruction virtual address space as shown in FIG. 24, the distant between the data virtual address space and instruction virtual address space becomes short, so that the hit efficiency can be improved. As compared to the instruction virtual address space and data virtual address space shown in FIG. 25, the virtual address spaces shown in FIG. 24 have three virtual addresses for the instruction and three virtual addresses for the data, whereas the virtual address spaces shown in FIG. 25 have six virtual addresses for the instruction and four virtual address for the data. Namely, with the virtual address spaces shown in FIG. 24, three instructions can be reduced and two data can be reduced as compared to the virtual space in the related art.

Figure 27:
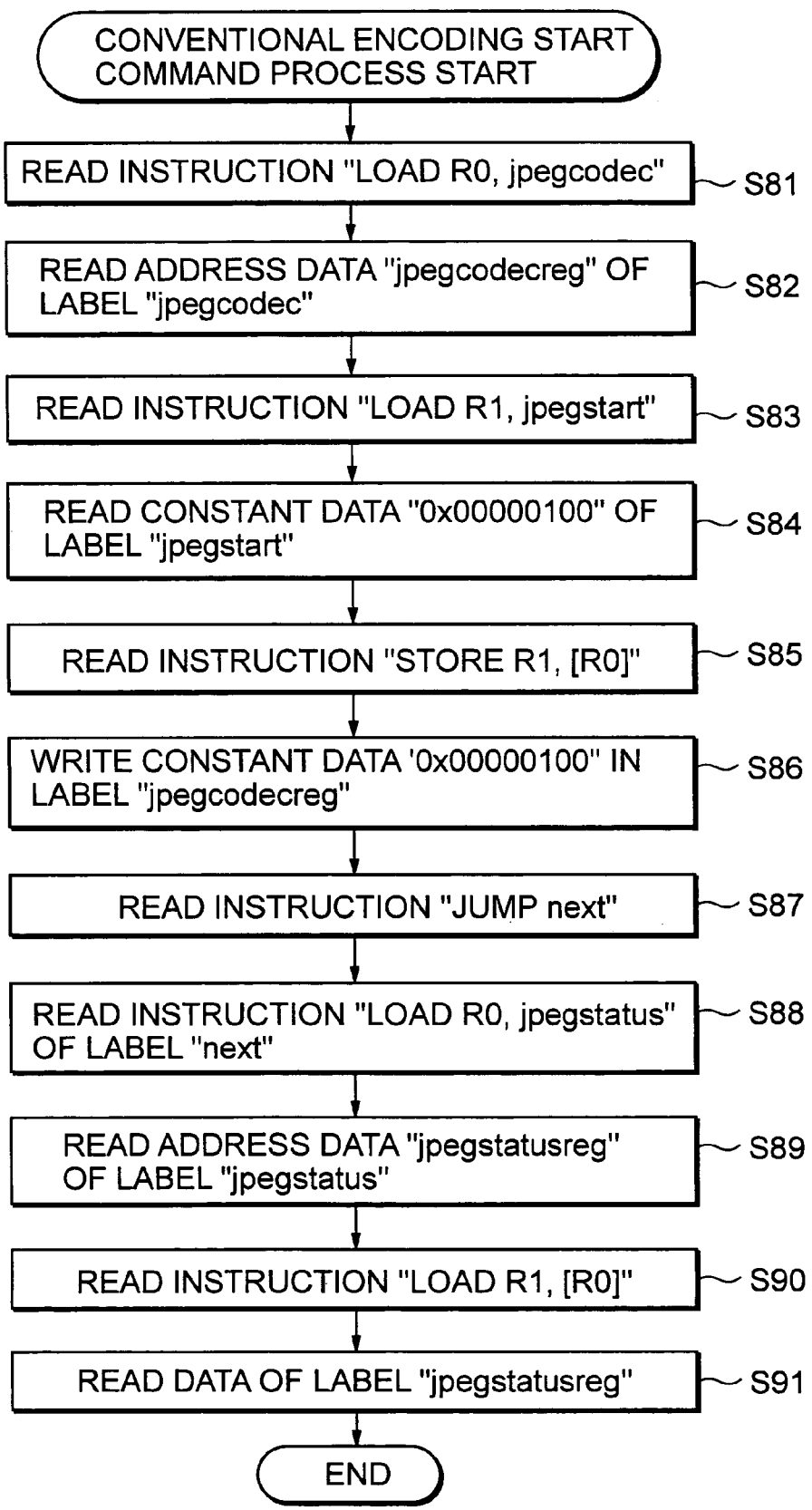
FIG. 27 is a flow chart illustrating an encoding start command processing in the related art as compared to FIG. 25.

The flow chart shown in FIG. 25 has six Steps, whereas the flow chart shown in FIG. 27 in the related art has eleven Steps. With the virtual address spaces shown in FIG. 24, the number of Steps can be reduced and the processing speed can be improved.

In the foregoing description, the instruction virtual address space and data virtual address space shown in FIG. 25 are structured based upon the structure of the virtual address spaces described with reference to FIG. 7. Instead, the instruction virtual address space and data virtual address space may be structured based upon the structure of the virtual address spaces described with reference to FIG. 11.

Also in the foregoing description, although two virtual spaces are used separately for the instructions and data, the number of virtual spaces is not limited only to two, but a plurality of virtual spaces may be used. Although the instruction address translation unit 64 and data address translation unit 66 are used separately for the instruction and data virtual address spaces, one address translation may have a plurality of translation tables to translate a plurality of virtual addresses at a time by giving an identifier to a virtual address supplied from each bus. Alternatively, one address translation unit may translate a virtual address of only either the instruction or the data.

The present invention is applicable not only to the imaging apparatus 201, but also to a personal computer, a PDA, a DVD player, a set-top box, a router, a robot, a home server, a portable terminal, a game machine, a network terminal and the like.

Although a series of processing described above can be executed by hardware, it maybe executed by software. In this case, for example, the information processing apparatus 51 shown in FIG. 5 is changed to an information processing apparatus 301 such as shown in FIG. 28. Although not shown, the imaging apparatus 201 shown in FIG. 18 is changed in the manner similar to the information processing apparatus 301.

Referring to FIG. 28, a central processing unit (CPU) 311 executes various processing in accordance with a program stored in a read only memory (ROM) 312 or loaded in a random access memory (RAM) 313 from as to rage unit 318. RAM 313 stores therein data and the like necessary for the CPU 311 to execute various processing.

The CPU 311, ROM 312 and RAM 313 are interconnected via a bus 314. An input/output interface 315 is also connected to the bus 314.

The input/output interface 315 is connected to: an input unit 316 including a keyboard, a mouse and the like; an output unit 317 including a display such as a cathode ray tube and a liquid crystal display, a speaker and the like; the storage unit 318 such as a hard disk; and to a communication unit 319 including a modem, a terminal adapter and the like. The communication unit 319 performs a communication processing via a network (not shown).

A drive 320 is connected to the input/output interface 315 if necessary. In this drive 320, a magnetic disk 321, an optical disk 322, a magneto optical disk 323, a semiconductor memory 324 or the like is loaded, and a computer program read therefrom is installed in the storage unit 318 if necessary.

If a series of processing described above are to be executed by using soft ware, a program constituting the software is installed from a network or storage medium into a computer build in dedicated hardware or into an apparatus such as a general personal computer capable of executing various functions by installing various programs.

The storage medium may be external package media such as shown in FIG. 28 including the magnetic disk 321 (including a flexible disk), optical disk 322 (compact disk-read only memory (CD-ROM)), a digital versatile disk (DVD), magneto optical disk 323 (Mini-Disk (MD) (trademark), or semiconductor memory 324, respectively storing a program to be distributed to users, or it may be the internal ROM 312 or a hard disk in the storage unit 319, respectively storing the program.

In this specification, steps describing a program to be recorded in a storage medium obviously include the processing to be executed time sequentially in the order of description, and also include the processing not necessarily executed time sequentially but executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus including processor means for executing an operation, the information processing apparatus comprising:

a plurality of functional units for performing functional processes;

storage means for storing said instruction and data for said processor means to execute said operation and including input/output registers for transferring said instruction and data between said processor means and said functional units;

first and second transfer means for transferring said instruction or data between said processor means and said storage means;

first address translation means for translating an instruction virtual address designated by said processor means into a physical address of said storage means; and second address translation means for translating a data virtual address including the virtual addresses of said data and said input/output registers designated by said processor means into a physical address of said storage means, wherein each of said first and second transfer means includes an independent respective first and second virtual address space each including virtual addresses, wherein the virtual addresses in the first virtual address space overlap with the virtual addresses in the second virtual address space;

said first and second address translation means translate said virtual address space of said respective first and second transfer means into a single physical address space;

the data virtual address space of said input/output registers and data are divided and disposed in a plurality of address areas so that the virtual addresses of an instruction and corresponding data and input/output registers are disposed at a near distance;

wherein, said first and second transfer means include an instruction bus for transferring said instruction and a data bus for transferring said data; and a difference between a virtual address of an instruction accompanying an access to said first and second transfer means and a virtual address of data accessed by said instruction is equal to or shorter than a distance which can be directly designated as a relative address by an operand of the instruction; and further comprising:

a cache, provided for each of said first and second transfer means, said cache using said virtual address as a tag, wherein said virtual address space includes virtual addresses in such a manner that a border between a virtual address of said instruction and a virtual address of said data becomes a line border of said cache.

2. The information processing apparatus according to claim 1, wherein if a translation unit of an address to be translated by said address translation means contains both a virtual address of said instruction and a virtual address of said data, data included in said translation unit is only constant data.

3. The information processing apparatus according to claim 1, wherein said address translation means translates said virtual address space of said respective first and second transfer means into said single physical address space having mutually non-overlapping addresses.

4. The information processing apparatus according to claim 1, wherein said storage means includes a write inhibited area and a write permitted area; and virtual addresses of both said write inhibited area and said write permitted area are disposed in a virtual address space in a range that can be directly designated as a relative address by an operand of an instruction accompanying an access to said storage means.

5. The information processing apparatus according to claim 1, wherein said storage means includes at least one input/output (I/O) register; and a difference between a virtual address of said instruction accompanying an access to said I/O register and a virtual address representative of said I/O register is equal to or shorter than a distance that can be directly designated as a relative address by an operand of said instruction.

6. The information processing apparatus according to claim 5, wherein a virtual address representative of a same I/O register is divided and disposed in a plurality of areas of said virtual address space.

7. The information processing apparatus according to claim 1, wherein said address translation means translates upper n bits of said virtual address of (n+m) bits, and at least one bit or more of the translated upper n bits is exchanged with at least one or more bits of the remaining m bits, thereby translating said virtual address into said physical address.

8. The information processing apparatus according to claim 1, wherein said address translation means translates upper n bits of said virtual address of (n+m) bits, and at least one bit or more of the remaining lower m bits is exchanged with another one bit or more of the remaining lower m bits, thereby translating said virtual address into said physical address.

9. An information processing method for an information processing apparatus, the information processing apparatus including:

processor means for executing an operation;

a plurality of functional units for performing functional processes;

storage means for storing said instruction and data for said processor means to execute said operation and including input/output registers for transferring said instruction and data between said processor means and said functional units;

first and second transfer means for transferring said instruction or data between said processor means and said storage means;

first address translation means for translating an instruction virtual address designated by said processor means into a physical address of said storage means; and second address translation means for translating a data virtual address including the virtual addresses of said data and said input/output registers designated by said processor means into a physical address of said storage means, wherein each of said first and second transfer means includes an independent respective first and second virtual address space each including virtual addresses, wherein the virtual addresses in the first virtual address space overlap with the virtual addresses in the second virtual address space;

first and second address translation means include a translation step of translating said virtual address space of said respective first and second transfer means into a single physical address space;

the data virtual address space of said input/output registers and data are divided and disposed in a plurality of address areas so that the virtual addresses of an instruction and corresponding data and input/output registers are disposed at a near distance;

wherein, said first and second transfer means include an instruction bus for transferring said instruction and a data bus for transferring said data; and determining a difference between a virtual address of an instruction accompanying an access to said first and second transfer means and a virtual address of data accessed by said instruction that is equal to or shorter than a distance which can be directly designated as a relative address by an operand of the instruction; and further comprising:

a cache, provided for each of said first and second transfer means, said cache using said virtual address as a tag, wherein determining a cache line border of as a function of said difference between virtual addresses such that the border between a virtual address of said instruction and a virtual address of said data becomes the line border of said cache.

10. An imaging apparatus comprising:

imaging means for taking an image of an object;

encoding means for encoding image data of the object taken with said imaging means;

processor means for executing an operation of designating an instruction or data for said encoding means to encode said image data; and wherein the imaging apparatus further comprises:

a plurality of functional units for performing functional processes;

storage means for storing said instruction and data for said processor means to execute said operation and including input/output registers for transferring said instruction and data between said processor means and said functional units;

first and second transfer means for transferring said instruction or data between said processor means and said storage means;

first address translation means for translating an instruction virtual address designated by said processor means into a physical address of said storage means; and second address translation means for translating a data virtual address including the virtual addresses of said data and said input/output registers designated by said processor means into a physical address of said storage means, wherein each of said first and second transfer means includes an independent respective first and second virtual address space each including virtual addresses, wherein virtual addresses in the first virtual address space overlap with the virtual addresses in the second virtual address space;

said first and second address translation means translate said virtual address space of said respective first and second transfer means into a single physical address space;

the data virtual address space of said input/output registers and data are divided and disposed in a plurality of address areas so that the virtual addresses of an instruction and corresponding data and input/output registers are disposed at a near distance;

said encoding means encodes said image data in accordance with said instruction or data in said storage means corresponding to an address designated by said processor means and translated by said address translation means;

wherein, said first and second transfer means include an instruction bus for transferring said instruction and a data bus for transferring said data; and a difference between a virtual address of an instruction accompanying an access to said first and second transfer means and a virtual address of data accessed by said instruction is equal to or shorter than a distance which can be directly designated as a relative address by an operand of the instruction; and further comprising:

a cache, provided for each of said first and second transfer means, said cache using said virtual address as a tag, wherein said virtual address space includes virtual addresses in such a manner that a border between a virtual address of said instruction and a virtual address of said data becomes a line border of said cache.

11. An information processing apparatus including a processor for executing an operation, the information processing apparatus comprising:

a plurality of functional units for performing functional processes;

a storage for storing said instruction and data for said processor to execute said operation and including input/output registers for transferring said instruction and data between said processor and said functional units;

first and second transfer sections for transferring said instruction or data between said processor and said storage;

a first address translator for translating a virtual address designated by said processor into a physical address of said storage; and a second address translator for translating a data virtual address including the virtual addresses of said data and said input/output registers designated by said processor into a physical address of said storage means, wherein each of said first and second transfer sections includes an independent respective first and second virtual address space each including virtual addresses, wherein virtual addresses in the first virtual address space overlap with the virtual addresses in the second virtual address space;

said first and second address translators translate said virtual address space of said respective first and second transfer sections into a single physical address space;

the data virtual address space of said input/output registers and data are divided and disposed in a plurality of address areas so that the virtual addresses of an instruction and corresponding data and input/output registers are disposed at a near distance;

wherein, said first and second transfer means include an instruction bus for transferring said instruction and a data bus for transferring said data; and a difference between a virtual address of an instruction accompanying an access to said first and second transfer means and a virtual address of data accessed by said instruction is equal to or shorter than a distance which can be directly designated as a relative address by an operand of the instruction; and further comprising:

a cache, provided for each of said first and second transfer means, said cache using said virtual address as a tag, wherein said virtual address space includes virtual addresses in such a manner that a border between a virtual address of said instruction and a virtual address of said data becomes a line border of said cache.

12. An imaging apparatus comprising:

an imaging section for taking an image of an object;

an encoder for encoding image data of the object taken with said imaging section;

a processor for executing an operation of designating an instruction or data for said encoder to encode said image data;

wherein the imaging apparatus further comprises:

a plurality of functional units for performing functional processes;

a storage means storing said instruction and data for said processor to execute said operation and including input/ output registers for transferring said instruction and data between said processor and said functional units;

first and second transfer sections for transferring said instruction or data between said processor and said storage;

a first address translator for translating a virtual address designated by said processor into a physical address of said storage; and a second address translator for translating a data virtual address including the virtual addresses of said data and said input/output registers designated by said processor into a physical address of said storage means, wherein each of said first and second transfer sections includes an independent respective first and second virtual address space each including virtual addresses, wherein the virtual addresses in the first virtual address space overlap with the virtual addresses in the second virtual address space;

said first and second address translators translate said virtual address space of said respective first and second transfer sections into a single physical address space;

the data virtual address space of said input/output registers and data are divided and disposed in a plurality of address areas so that the virtual addresses of an instruction and corresponding data and input/output registers are disposed at a near distance;

said encoder encodes said image data in accordance with said instruction or data in said storage corresponding to an address designated by said processor and translated by said address translation section;

wherein, said first and second transfer means include an instruction bus for transferring said instruction and a data bus for transferring said data; and a difference between a virtual address of an instruction accompanying an access to said first and second transfer means and a virtual address of data accessed by said instruction is actual to or shorter than a distance which can be directly designated as a relative address by an operand of the instruction; and further comprising:

a cache, provided for each of said first and second transfer means, said cache using said virtual address as a tag, wherein said virtual address space includes virtual addresses in such a manner that a border between a virtual address of said instruction and a virtual address of said data becomes a line border of said cache.

* * * * *

UNITED STATES PATENT AND TRADEMARK OFFICE
CERTIFICATE OF CORRECTION

PATENT NO.        : 7,213,108 B2
APPLICATION NO. : 10/815871
DATED             : May 1, 2007
INVENTOR(S)       : Koji Ozaki It is certified that error appears in the above-identified patent and that said Letters Patent is hereby corrected as shown below:

Column 9, line 23, change "process or" to --processor--;
    line 56, change "process or" to --processor--.
Column 11, line 48, change "0x10000" to --0x100000--.
Column 12, line 41, change "CUP" to --CPU--;
    line 49, change "CUP" to --CPU--.
Column 13, line 14, change "address) Even" to --address). Even--;
    line 54, change "separates" to --separate--.
Column 16, line 40, change "CUP" to --CPU--;
    line 47, change "CUP" to --CPU--;
    line 55, change "CUP" to --CPU--;
    line 62, change "CUP" to --CPU--;
    line 65, change "oh" to --of--.
Column 21, line 16, change "maybe" to --may be--;
    line 41, change "JPEG-encodes" to --JPEG encodes--.
Column 23, line 30, change "153-14" to --253-14--;
    line 54, change "(stored) These" to --(stored). These--.
Column 24, line 13, change "2531-3" to --251-3--.
Column 26, line 36, change "where at" to --whereat--;
    line 42, change "CPU61" to --CPU 61--.
Column 27, line 43, change "the-command" to --the command--.
Column 29, line 18, change "distant" to --distance--;
    line 27, change "address" to --addresses--.
Column 30, line 4, change "as to rage" to --a storage--;
    line 25, change "soft ware" to --software--.
Column 36, line 13, change "actual" to --equal--.

Signed and Sealed this

Sixth Day of November, 2007

JON W. DUDAS
*Director of the United States Patent and Trademark Office*